United States Patent
Nagao et al.

(10) Patent No.: US 7,667,869 B2
(45) Date of Patent: Feb. 23, 2010

(54) IMAGE PROCESSING DEVICE, IMAGE PROCESSING METHOD, AND PRINTER DRIVER

(75) Inventors: Noriaki Nagao, Ibaraki-ken (JP); Kouichi Nobushima, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 610 days.

(21) Appl. No.: 10/591,746

(22) PCT Filed: Mar. 15, 2005

(86) PCT No.: PCT/JP2005/004503
§ 371 (c)(1),
(2), (4) Date: Sep. 6, 2006

(87) PCT Pub. No.: WO2005/091617
PCT Pub. Date: Sep. 29, 2005

(65) Prior Publication Data
US 2007/0188779 A1 Aug. 16, 2007

(30) Foreign Application Priority Data
Mar. 19, 2004 (JP) ............................. 2004-080152

(51) Int. Cl.
*G03F 3/08* (2006.01)
(52) U.S. Cl. .................. 358/1.9; 358/518; 358/523
(58) Field of Classification Search .............. 358/1.1, 358/1.4, 1.9, 3.23, 500, 501, 518, 523
See application file for complete search history.

(56) References Cited

U.S. PATENT DOCUMENTS 5,687,300 A * 11/1997 Cooper ..................... 358/1.9
6,104,829 A * 8/2000 Nakajima ................. 382/167

FOREIGN PATENT DOCUMENTS

| JP | 06-079853 | 3/1994 |
| JP | 07-156362 | 6/1995 |
| JP | 11-296664 | 10/1999 |
| JP | 2001-186368 | 7/2001 |
| JP | 2001-277473 | 10/2001 |
| JP | 2003-046794 | 2/2003 |
| JP | 2003-169233 | 6/2003 |
| JP | 2003-174567 | 6/2003 |
| JP | 2003-338940 | 11/2003 |
| JP | 2004-291604 | 10/2004 |

* cited by examiner

*Primary Examiner*—Thomas D Lee
(74) *Attorney, Agent, or Firm*—The Nath Law Group; Jerald L. Meyer; Jonathan A. Kidney

(57) ABSTRACT

An image processing device (140), which converts multivalued pixel values of an RGB color space corresponding to original colors of a multicolor original image into multivalued pixel values of a CMY color space corresponding to color inks used for printing in order to overprint a multicolor original with a plurality of color inks, includes: a color space coordinate conversion unit (141) configured to convert the multivalued pixel values of the RGB color space into the multivalued pixel values of the CMY color space corresponding to the color inks used for printing with reference to a color conversion LUT (131) for storing relationship between the multivalued pixel values of the RGB color space and the multivalued pixel values of the CMY color space; and a correction unit (142) configured to correct the multivalued pixel values of the CMY color space converted with reference to the color conversion LUT in response to the color inks used for printing and an overprint sequence thereof.

12 Claims, 12 Drawing Sheets

| AREA | PATTERN 1 | PATTERN 2 | PATTERN 3 |
|---|---|---|---|
| 1 | 8.89 | 21.64 | 8.01 |
| 2 | 6.98 | 14.53 | 5.80 |
| 3 | 3.74 | 7.72 | 3.53 |
| 4 | 2.74 | 4.34 | 2.26 |
| 5 | 1.65 | 1.68 | 1.75 |
| 6 | 25.98 | 39.09 | 19.47 |
| 7 | 21.46 | 29.39 | 13.50 |
| 8 | 11.39 | 14.15 | 9.02 |
| 9 | 6.11 | 6.89 | 5.53 |
| 10 | 0.74 | 0.96 | 1.08 |
| 11 | 55.01 | 60.23 | 53.83 |
| 12 | 43.73 | 45.03 | 40.62 |
| 13 | 22.17 | 21.98 | 20.01 |
| 14 | 10.71 | 10.62 | 9.88 |
| 15 | 0.80 | 0.78 | 0.65 |
| 16 | 68.64 | 71.29 | 68.91 |
| 17 | 53.90 | 53.61 | 51.62 |
| 18 | 26.79 | 26.01 | 25.37 |
| 19 | 13.25 | 12.72 | 11.77 |
| 20 | 0.42 | 0.43 | 0.41 |
| 21 | 78.47 | 78.66 | 78.03 |
| 22 | 61.12 | 60.98 | 60.24 |
| 23 | 30.71 | 30.24 | 29.85 |
| 24 | 15.02 | 14.15 | 13.41 |
| 25 | 0.98 | 0.99 | 0.96 |

FIG. 15B

| AREA | PATTERN 1 | PATTERN 2 | PATTERN 3 |
|---|---|---|---|
| 1 | 1.000 | 2.434 | 0.901 |
| 2 | 1.000 | 2.082 | 0.831 |
| 3 | 1.000 | 2.064 | 0.944 |
| 4 | 1.000 | 1.584 | 0.825 |
| 5 | 1.000 | 1.018 | 1.061 |
| 6 | 1.000 | 1.505 | 0.749 |
| 7 | 1.000 | 1.370 | 0.629 |
| 8 | 1.000 | 1.242 | 0.792 |
| 9 | 1.000 | 1.128 | 0.905 |
| 10 | 1.000 | 1.297 | 1.459 |
| 11 | 1.000 | 1.095 | 0.979 |
| 12 | 1.000 | 1.030 | 0.929 |
| 13 | 1.000 | 0.991 | 0.903 |
| 14 | 1.000 | 0.992 | 0.923 |
| 15 | 1.000 | 0.975 | 0.813 |
| 16 | 1.000 | 1.039 | 1.004 |
| 17 | 1.000 | 0.995 | 0.958 |
| 18 | 1.000 | 0.971 | 0.947 |
| 19 | 1.000 | 0.960 | 0.888 |
| 20 | 1.000 | 1.024 | 0.976 |
| 21 | 1.000 | 1.002 | 0.994 |
| 22 | 1.000 | 0.998 | 0.986 |
| 23 | 1.000 | 0.985 | 0.972 |
| 24 | 1.000 | 0.942 | 0.893 |
| 25 | 1.000 | 1.010 | 0.980 |

IMAGE PROCESSING DEVICE, IMAGE PROCESSING METHOD, AND PRINTER DRIVER

TECHNICAL FIELD

The present invention relates to an image processing device, an image processing method, and a printer driver, which make it possible to convert multivalued pixel values of an original color space corresponding to original colors (color lights) of multicolor original image data into multivalued pixel values of a color space corresponding to color inks used for printing in order to overprint a multicolor original with a plurality of color inks.

BACKGROUND ART

In general, in the case of overprinting a multicolor original (original for multicolors) with a plurality of color inks, so-called "color separation" is performed. In the color separation, multivalued pixel values of a color space (for example, RGB color space) corresponding to original colors (color lights) in a multicolor original image are converted into multivalued pixel values of a color space (for example, CMY color space) corresponding to color inks used for printing.

An algorism of color separation processing is broadly divided into a method of converting the RGB color space into the CMY color space by a transformation represented by Neugebauer's equation (for example, Japanese Patent Laid-Open Publication No. 2001-277473) and a method of converting the RGB color space into the CMY color space by using a color conversion lookup table (hereinafter, abbreviated as "color conversion LUT") (for example, Japanese Patent Laid-Open Publication 2001-186368). The algorism of the color separation processing by the color conversion LUT is more often used, in which it is easy to perform an intentional shift of a color gamut (preferable color reproduction).

In the case of performing the overprinting with the plurality of color inks, specifically, before a color ink to be previously printed (hereinafter, referred to as "previously-printed color ink") is dried up, a color ink printed later (hereinafter, referred to as "later-printed color ink") is overprinted thereon. Accordingly, problems such as a bleeding phenomenon, a trapping phenomenon, and a back-trapping phenomenon occur between the previously-printed color ink and the later-printed color ink. Therefore, a desired result of the printing cannot be obtained.

Note that the bleeding phenomenon is a phenomenon that the previously-printed color ink and the later-printed color ink are blended, the trapping phenomenon is a phenomenon that the later-printed color ink is transferred onto the previously-printed color ink, and the back-trapping phenomenon is a phenomenon that the previously-printed color ink is absorbed to an image carrier for the later printing (equivalent to a printing drum in a stencil printing machine according to the present invention). Among them, influences from the trapping phenomenon and the back-trapping phenomenon on the result of the printing cannot be ignored.

Accordingly, it has been necessary to prepare the color conversion LUT with the trapping phenomenon and the back-trapping phenomenon taken into consideration. However, the influences from the trapping phenomenon and the back-trapping phenomenon are varied owing to the color inks used for overprinting and an overprint sequence of the color inks. Accordingly, it has been necessary to prepare the color conversion LUTs corresponding to the respective cases.

Therefore, enormous cost and time have been required for creating the color conversion LUTs, and a storage capacity of a storage device which stores the color conversion LUTs has been enormously increased.

DISCLOSURE OF THE INVENTION

The present invention has been made in consideration of the circumstances as described above. It is an object of the present invention to provide an image processing device, an image processing method, and a printer driver, which are capable of obtaining the desired result of the overprinting even if the color conversion LUT with the trapping phenomenon and the back-trapping phenomenon taken into consideration is not prepared in advance in order to perform the overprinting for the multicolor original with the plurality of color inks.

The image processing device according to the present invention is an image processing device for, when overprinting a multicolor original with a plurality of color inks, converting multivalued pixel values of a color space corresponding to an image of the multicolor original into multivalued pixel values of a color space corresponding to the color inks. The image processing device is characterized by including a color space coordinate conversion unit and a correction unit. The color space coordinate conversion unit, with reference to a color conversion LUT which stores relationship between the multivalued pixel values of the color space corresponding to the multicolor original and the multivalued pixel values of the color space corresponding to the color inks, converts the multivalued pixel values of the color space corresponding to the multicolor original into the multivalued pixel values of the color space corresponding to the color inks. The correction unit corrects at least one of the multivalued pixel values of the color space corresponding to the color inks, the multivalued pixel values being converted based on the color conversion LUT, and the multivalued pixel values of the color space corresponding to the color inks, the multivalued pixel values being stored in the color conversion LUT, according to the color inks and an overprint sequence of the color inks.

Moreover, the image processing method according to the present invention is an image processing method for, when overprinting a multicolor original with a plurality of color inks, converting multivalued pixel values of a color space corresponding to an image of the multicolor original into multivalued pixel values of a color space corresponding to the color inks, the image processing method comprising the steps of: with reference to a color conversion LUT which stores relationships between the multivalued pixel values of the color space corresponding to the multicolor original and the multivalued pixel values of the color space corresponding to the color inks, converting an arbitrary pixel value selected from among the multivalued pixel values of the color space corresponding to the multicolor original into the multivalued pixel value of the color space corresponding to the color inks; and correcting the converted multivalued pixel values of the color space corresponding to the color inks according to the color inks and an overprint sequence of the color inks. Alternatively, the image processing method according to the present invention is an image processing method for, when overprinting a multicolor original with a plurality of color inks, converting multivalued pixel values of a color space corresponding to an image of the multicolor original into multivalued pixel values of a color space corresponding to the color inks, the image processing method comprising the steps of: correcting, according to the color inks and an overprint sequence of the color inks, the multivalued pixel values of the color space corresponding to the color inks, the multivalued pixel values being stored in a color conversion LUT which stores relationship between the multivalued pixel values of the color space corresponding to the multicolor original and the multivalued pixel values of the color space corresponding to the color inks; and converting an arbitrary pixel value selected from among the multivalued pixel values of the color space corresponding to the multicolor original into the multivalue pixel value of the color space corresponding to the color inks with reference to the corrected color conversion LUT.

Moreover, the printer driver according to the present invention is a printer driver of a printing machine which overprints a multicolor original with a plurality of color inks based on image data of the multicolor original, the image data being created by an application program. The printer driver is characterized by including a color space coordinate conversion unit and a correction unit. The color space coordinate conversion unit, with reference to a color conversion LUT which stores relationship between multivalued pixel values of a color space corresponding to the multicolor original and multivalued pixel values of a color space corresponding to the color inks, converts the multivalued pixel values of the color space corresponding to the multicolor original into multivalued pixel values of the color space corresponding to the color inks. The correction unit corrects at least one of the multivalued pixel values of the color space corresponding to the color inks, the multivalued pixel values being stored in the color conversion LUT, and the multivalued pixel values of the color space corresponding to the color inks, the multivalued pixel values being converted with reference to the color conversion LUT, according to the color inks and an overprint sequence of the color inks.

Specifically, the multivalued pixel values of the color space corresponding to the color inks, the multivalued pixel value being converted with reference to the color conversion LUT or the multivalued pixel values of the color space corresponding to the color inks, the multivalued pixel values being stored in the color conversion LUT, are corrected in response to the color inks used for printing and the order of the overprinting thereof with reference to the color conversion LUT. Accordingly, a good result of the overprinting can be obtained even if the color conversion LUT with the trapping phenomenon and the back-trapping phenomenon taken into consideration is not prepared in advance.

Moreover, when the multivalued pixel values of the color space corresponding to a later-printed color ink in accordance with the order of the overprinting are equal to or more than a predetermined threshold value, the correction unit calculates a correction factor from the threshold value and the multivalued pixel values of the color space corresponding to the a later-printed color ink. Then, by using the calculated correction factor, the correction unit corrects the multivalued pixel values of the color space corresponding to a previously-printed color ink, thus making it possible to prevent a decrease of a printing density of the later-printed color ink owing to the trapping phenomenon.

Alternatively, the correction unit calculates a correction factor from the multivalued pixel values of the color space corresponding to a previously-printed color ink and a trapping rate of a later-printed color ink in accordance with the order of the overprinting. Then, by using the calculated correction factor, the correction unit corrects the multivalued pixel values of the color space corresponding to the later-printed color ink, thus making it possible to prevent the decease of the printing density of the later-printed color ink owing to the trapping phenomenon.

Moreover, the correction unit calculates a correction factor from the multivalued pixel values of the color space corresponding to a later-printed color ink and a back-trapping rate of a previously-printed color ink in accordance with the order of the overprinting. Then by using the calculated correction factor, the correction unit corrects the multivalued pixel values of the color space corresponding to the previously-printed color ink, thus making it possible to prevent the decease of the printing density of the previously-printed color ink owing to the back-trapping phenomenon.

According to the present invention, the image processing device, the image processing method, and the printer driver can be provided, which make it possible to obtain the desired result of the overprinting even if the color conversion LUT with the trapping phenomenon and the back-trapping phenomenon into consideration is not prepared in advance.

BRIEF DESCRIPTION OF DRAWINGS

FIGS. 14A to 14C are views showing images of printed sheets in experimental examples: FIG. 14A shows an image of a result of printing in a case of printing only with a previously-printed color ink; FIG. 14B shows an image of a result of the printing in a case of printing only with a later-printed color ink; and FIG. 14C shows an image of a result of the printing in a case of overprinting with the later-printed color ink after the previously-printed color ink is printed.

FIG. 15A is a table showing measurement values of a* (reddishness) among L*a*b* values, which are obtained by measuring the respective areas of the printed sheets in the experimental examples, and FIG. 15B is a table showing ratios of Patterns 2 and 3 when the measurement values of Pattern 1, which are shown in FIG. 15A, are converted to 1.

BEST MODE FOR CARRYING OUT THE INVENTION

Figure 1:
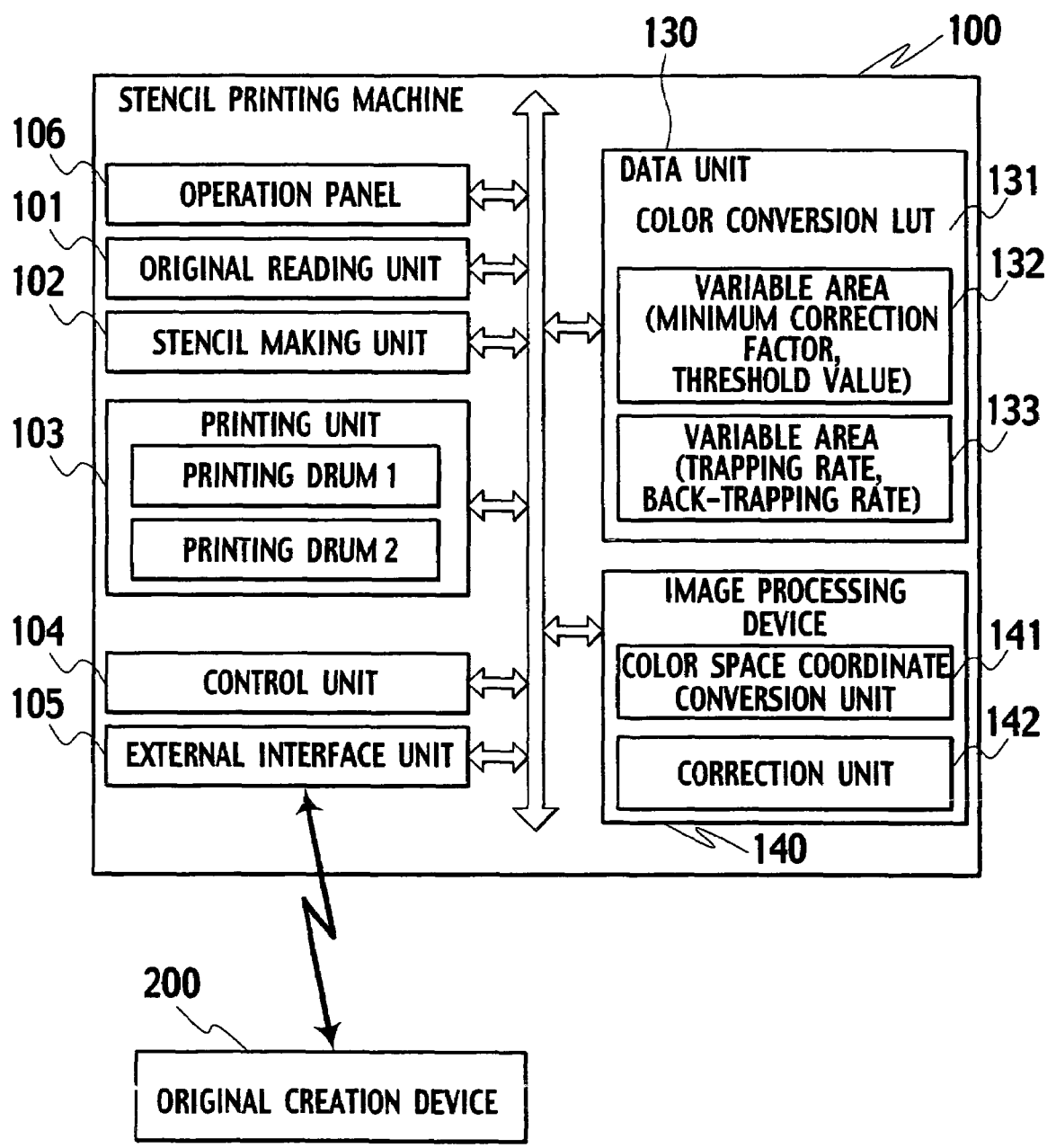
FIG. 1 is a schematic block diagram illustrating a configuration of a printing system according to this embodiment.

A description will be made below in detail of embodiments of the present invention with reference to FIGS. 1 to 16. Note that the same or equivalent reference numerals will be assigned to the same or equivalent regions or constituents throughout the respective drawings, and a description thereof will be omitted or simplified.

EMBODIMENT 1

FIG. 1 illustrates a printing system composed of a stencil printing machine 100 and an original creation device 200.

The stencil printing machine 100 is a multicolor printing machine, which includes an original reading unit 101, a stencil making unit 102, a printing unit 103, a control unit 104, an external interface unit 105, a data unit 130, an image processing device 140, and the like, and which is capable of simultaneously attaching thereto a plurality of printing drums (printing drum 1 and printing drum 2 in the example shown in FIG. 1). Color inks supplied from the respective printing drums are different from each other.

The control unit 104 is composed of a processing unit (CPU), a RAM, a ROM, and the like, any of which is not shown. The processing unit reads out programs and data, which are to be stored in the ROM, the data unit 130, and a storage unit (not shown), to the RAM, and the processing unit processes the read programs and data. Based on a result of the processing, the control unit 104 controls the entirety of the stencil printing machine 100.

The external interface unit 105 has a function for allowing the stencil printing machine 100 to connect to the other devices (for example, original creation device 200) through a network and the like.

The original reading unit 101 optically reads an image of a multicolor original to be printed. The stencil making unit 102 thermally perforates a stencil sheet for each separated stencil, that is, for each color ink used for printing based on single color image data read in the original reading unit 101 and subjected to color separation processing in the image processing device 140, thereby making each stencil.

The printing unit 103 has an attachment position 1 and an attachment position 2, each of which is capable of attaching a printing drum thereto. The printing unit 103 performs the printing in such a manner that a print sheet is pressed to the printing drums attached to the respective attachment positions in order from the attachment position 1 to the attachment position 2, and that the color inks supplied from the respective printing drums are transferred to the print sheet through perforations of the stencil sheets loaded on the printing drums. Note that the printing drum attached to the attachment position 1 is defined as a printing drum 1, and that the printing drum attached to the attachment position 2 is defined as a printing drum 2.

The data unit 130 is composed of a color conversion LUT 131, a variable area 132, and a variable area 133. The color conversion LUT stores relationships between multivalued pixel values (for example, (r, g, b)) of the RGB color space and multivalued pixel values (for example, (C1rgb, C2rgb)) of a CMY color space. Note that the color conversion LUT 131 just needs to store only a relationship between the RGB color space and the CMY color space, without the trapping phenomenon and a back-trapping phenomenon taken into consideration. The variable area 132 stores a threshold value M, a minimum correction factor Hmin, and the like, and the variable area 133 stores a trapping rate, a back-trapping rate, and the like. Note that the color conversion LUT 131, the variable area 132 and the variable area 133 may also be provided in the image processing device 140.

The image processing device 140 includes a color space coordinate conversion unit 141 and a correction unit 142. The image processing device 140 converts multicolor original image data read in the original reading unit 101 into the multivalued pixel values of the RGB color space, converts the converted multivalued pixel values of the RGB color space into the multivalued pixel values of the CMY color space corresponding to the color inks used for printing, and corrects the converted multivalued pixel values of the CMY color space in response to the color inks used for overprinting and an overprint sequence of the color inks. Alternatively, the image processing device 140 converts multivalued pixel values of the RGB color space of multicolor original image data transmitted from the original creation device 200 into the multivalued pixel values of the CMY color space corresponding to the color inks used for printing, and the image processing device 140 corrects the converted multivalued pixel values of the CMY color space in response to the color inks used for printing and the order of the overprinting thereof. Moreover, the image processing device 140 acquires information regarding the color inks used for printing and the order of the overprinting thereof from the control unit 104.

With reference to the color conversion LUT 131, the color space coordinate conversion unit 141 converts multivalued pixel values of the RGB color space corresponding to the multicolor original image data into the multivalued pixel values of the CMY color space corresponding to the color inks used for printing. In response to the color inks used for printing and the order of the overprinting thereof, the correction unit 142 corrects the multivalued pixel values of the CMY color space, which are stored in the color conversion LUT 131, or the multivalued pixel values of the CMY color space, which are converted based on the color conversion LUT 131.

Figure 2:
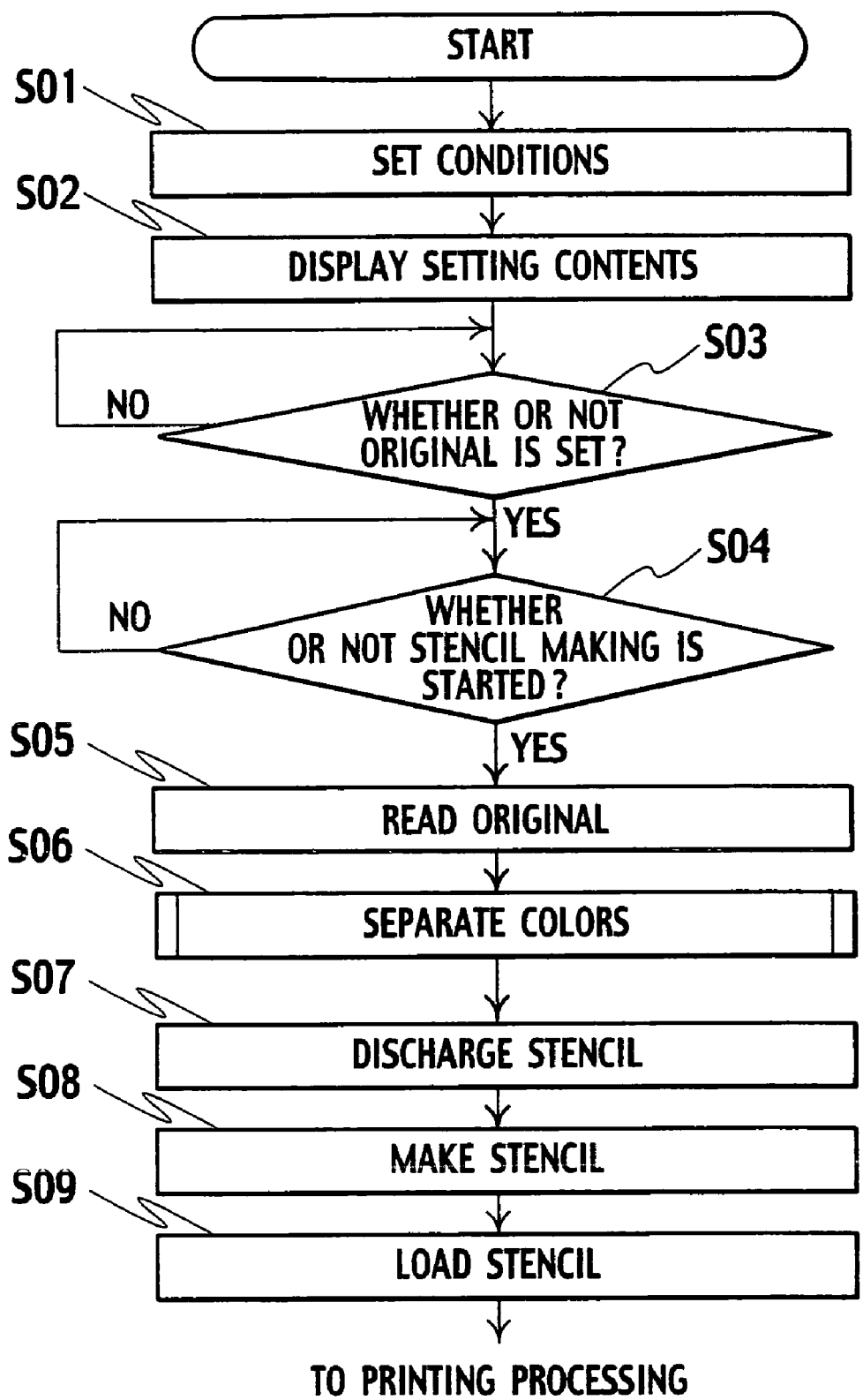
FIG. 2 is a flowchart showing an example of a processing operation of a stencil printing machine in the printing system shown in FIG. 1.

FIG. 2 is a flowchart showing an example of a processing operation of the stencil printing machine 100 in the case of reading a multicolor original image to be printed, by the original reading unit 101, and performing stencil making and printing processing for the read image data based on the single color image data subjected to the color separation processing in the image processing device 140. Note that the processing operation of the stencil printing machine 100, which is shown below, is started when a stencil making/printing screen (not shown) displayed on an operation panel 106 is selected, and is realized in such a manner that the control unit 104 controls the respective units of the stencil printing machine 100.

In Step S01, the control unit 104 receives condition setting such as the color inks used for printing and the order of the overprinting thereof, which are inputted from the operation panel 106 by a user, and in processing of Step S02, the control unit 104 displays setting contents thus set on the operation panel 106.

In Step S03, the control unit 104 determines whether or not the original is set on the original reading unit 101. In the case of having determined that the original is set, the control unit 104 advances the processing to Step S04, and in the case of having determined that the original is not set, the control unit 104 stands by.

In Step S04, the control unit 104 determines whether or not start of the stencil making is instructed from the operation panel 106. In the case of having determined that the start of the stencil making is instructed, the control unit 104 advances the processing to Step S05, and in the case of having determined that the start of the stencil making is not instructed, the control unit 104 stands by.

In Step S05, the original reading unit 101 reads the image of the original set on an original set stage, and sends the read image data to the image processing device 140.

In Step S06, the image processing device 140 executes color separation processing to be described later, and sends the original image data (stencil-making image data) subjected to the color separation processing to the stencil making unit 102.

In Step S07, the control unit 104 discharges used stencil sheets loaded on the printing drum 1 and the printing drum 2.

In Step S08, the stencil making unit 102 performs stencil making processing for stencil sheets based on the stencil-making image data sent from the image processing device 140.

In Step S09, the control unit 104 loads the stencil sheets subjected to the stencil making processing on the printing drum 1 and the printing drum 2. Thereafter, the control unit 104 advances the processing to printing processing.

Figure 3:
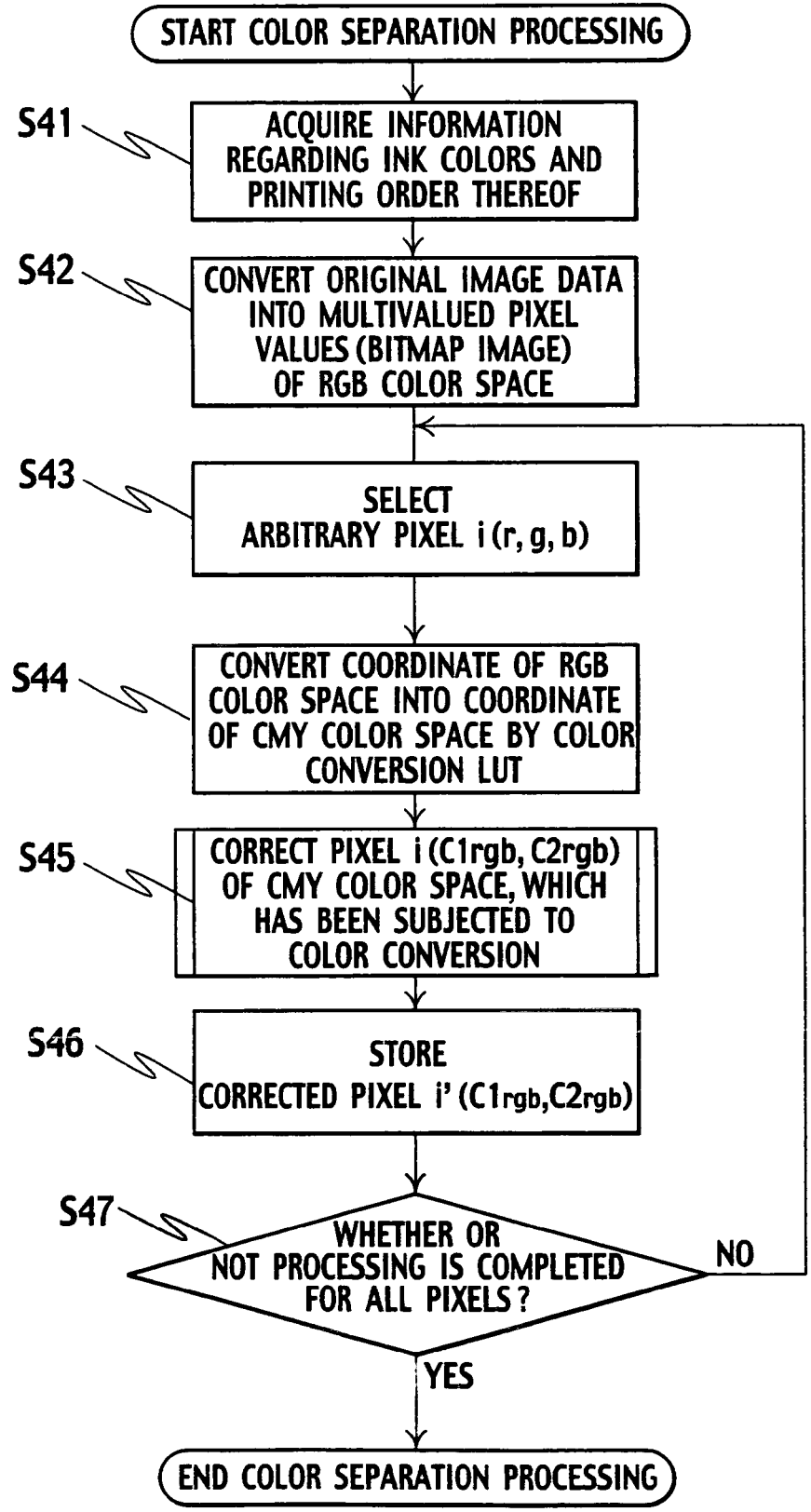
FIG. 3 is a flowchart illustrating a detailed processing procedure of color separation processing shown in Step S06 of FIG. 2.

FIG. 3 is a flowchart illustrating a detailed processing procedure of the color separation processing shown in Step S06 of FIG. 2. Here, a description will be made of the processing procedure by taking as an example the case of printing a multicolor original image by using two inks C1 and C2 of which colors are different from each other.

In Step S41, the image processing device 140 acquires, from the control unit 104, information regarding the color inks used for printing, and information regarding an overprint sequence (ink C1 to ink C2 or ink C2 to ink C1).

In Step S42, the image processing device 140 expands the multicolor original image data read in the original reading unit 101 into the multivalued pixel values (bitmap image) of the RGB color space.

In Step S43, the color space coordinate conversion unit 141 selects, as a parameter, an arbitrary pixel i(r, g, b) in the RGB multivalued image data, which is to be converted based on the color conversion LUT 131.

In Step S44, the color space coordinate conversion unit 141 converts the selected arbitrary pixel i (r, g, b) into a pixel i(C1rgb, C2rgb) of the CMY color space with reference to the color conversion LUT 131 in response to the selected arbitrary pixel i(r, g, b), and passes the converted pixel i(C1rgb, C2rgb) to the correction unit 142.

In Step S45, the correction unit 142 corrects the pixel i(C1rgb, C2rgb) of the CMY color space, which is received from the color space coordinate conversion unit 141, in response to the color inks used for printing and the order of the overprinting thereof. Details of the correction processing will be described later.

In Step S46, the control unit 104 stores the corrected pixel i' (C1rgb, C2rgb) of the CMY color space in the RAM of the control unit 104.

In Step S47, the image processing device 140 determines whether or not the correction processing is completed for the entire pixels in the RGB multivalued image data. When the correction processing is completed for the entire pixels, the image processing device 140 ends this color separation processing. On the contrary, when any unprocessed pixels remain, the image processing device 140 returns the processing to Step S43.

Figure 4:
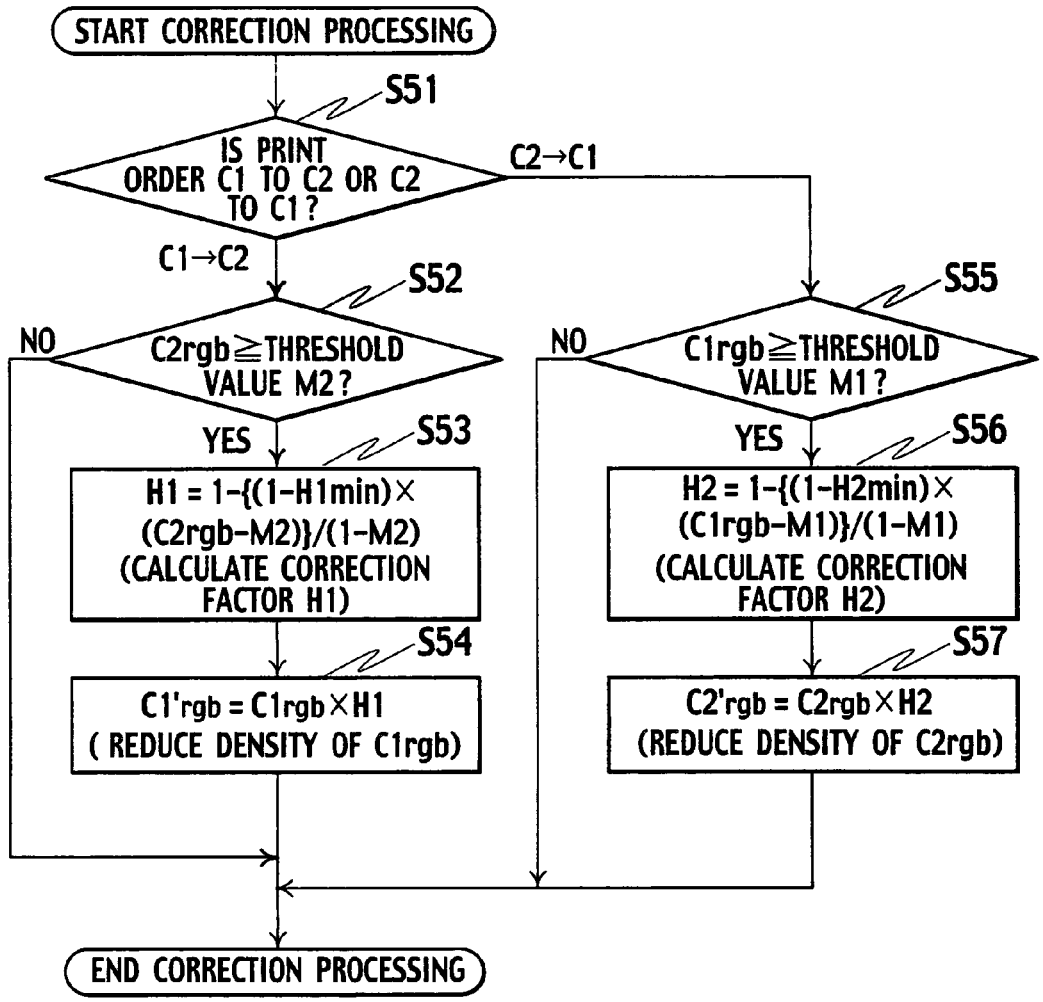
FIG. 4 is a flowchart illustrating a detailed processing procedure (Embodiment 1) of correction processing shown in Step S45 of FIG. 3.

FIG. 4 is a flowchart illustrating a detailed processing procedure (Embodiment 1) of the correction processing shown in Step S45 of FIG. 3. The arbitrary pixel i(r, g, b) of the RGB multivalued image data is converted into the pixel i(C1rgb, C2rgb) of the CMY color space with reference to the color conversion LUT 131 (where $0<C1rgb<1$, and $0\leq C2rgb \leq 1$).

In Step S51, the correction unit 142 refers to the information regarding the order of the overprinting, which is acquired in Step S41. When the previously-printed color ink is the ink C1, the correction unit 142 advances the processing to Step S52, and when the previously-printed color ink is the ink C2, the correction unit 142 advances the processing to Step S55.

In Step S52, the correction unit 142 compares a threshold value M2 ($0 \leq M2 \leq 1$) of the ink C2, which is stored in the variable area 132, and the pixel value C2rgb of the CMY color space of the ink C2 with each other. As a result of the comparison, when the pixel value C2rgb is less than the threshold value M2, that is, when a density of the pixel value C2rgb is less than a predetermined density, the correction unit 142 ends the processing without performing the correction since a decrease of a printing density owing to the trapping phenomenon is small.

As a result of the comparison in Step S52, when the pixel value C2rgb is equal to or more than the threshold value M2, in Step S53, the correction unit 142 calculates a correction factor H1 for correcting the pixel value C1rgb of the ink C1 as the previously-printed color ink (hereinafter, referred to as "previously-printed color ink C1") by Equation 1 from the multivalued pixel value C2rgb of the ink C2 as the later-printed color ink (hereinafter, referred to as "later-printed color ink C2") and the threshold value M2.

Note that H1min is a predetermined minimum correction factor ($0 \leq H1min \leq 1$) in the case of correcting the pixel value C1rgb, and prestored in the variable area 132. Moreover, the correction factor H1 ranges as: $H1min \leq H1 \leq 1$.

$$H1=1-\{(1-H1min)\times(C2rgb-M2)\}/(1-M2) \qquad (1)$$

Figure 5A:
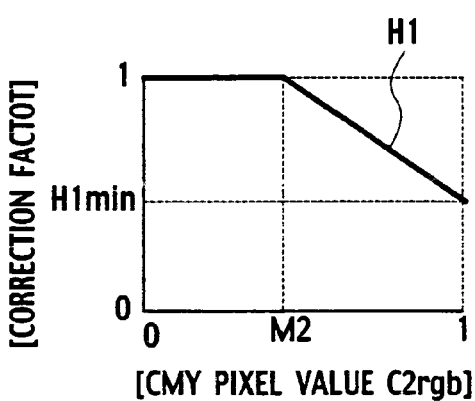
FIGS. 5A and 5B are views showing examples of correction factors calculated in Steps S53 and S56 of FIG. 4.
Figure 5B:
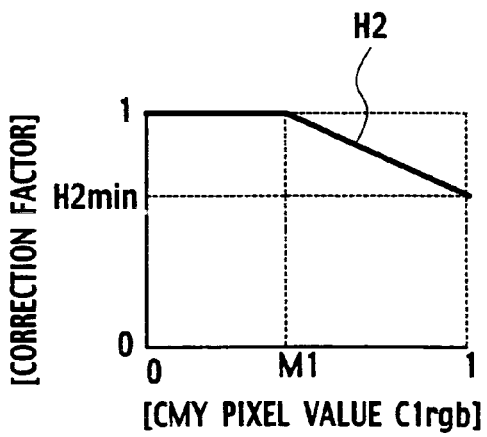

FIG. 5A shows an example of the correction factor H1 of the previously-printed color ink C1. Here, the threshold value M2 of the later-printed color ink C2 is taken as a boundary. In the case where the pixel value C2rgb is less than the threshold value M2, the correction factor H1 has flat characteristics of H1=1 (no correction). In the case where the pixel value C2rgb is equal to or more than the threshold value M2, the correction factor H1 has linear characteristics in which the minimum correction factor H1min is taken as the minimum value. These characteristics are based on an experimental result that, when the pixel value of the later-printed color ink C2 becomes less than a predetermined value (threshold value), the trapping phenomenon is decreased enough to be negligible. Moreover, though the correction factor H1 has nonlinear characteristics when the pixel value of the later-printed color ink C2 becomes equal to or more than the predetermined value (threshold value), it is confirmed that there is no problem in a practical use even if the nonlinear characteristics are approximated to the linear characteristics as shown in FIG. 5.

Next, in Step S54, the correction unit 142 corrects the pixel value C1rgb of the previously-printed color ink C1 by Equation 2 by using the calculated correction factor H1, and thus obtains the corrected pixel value C1'rgb.

$$C1'rgb=C1rgb \times H1 \qquad (2)$$

As described above, when the pixel value C2rgb of the CMY color space of the later-printed color ink C2 is equal to or more than the threshold value M2, the correction unit 142 calculates the correction factor H1 from the pixel value C2rgb of the later-printed color ink C2 and the threshold value M2. Then, by using the calculated correction factor H1, the correction unit 142 corrects downward the pixel value C1rgb of the CMY color space corresponding to the previously-printed color ink C1, thus making it possible to prevent the decrease of the printing density of the later-printed color ink C2 owing to the trapping phenomenon.

On the other hand, as a result of the determination in Step S51, when the previously-printed color ink is the ink C2, that is, when the order of the overprinting is as: ink C2 to ink C1, the correction unit 142 advances the processing to Step S55 to execute similar correction processing.

In Step S55, the correction unit 142 compares a threshold value M1 ($0 \leq M1 \leq 1$) of the ink C1, which is prestored in the variable area 132 of the storage unit 130, and the pixel value C1rgb of the CMY color space of the ink C1 with each other. As a result of the comparison, when the pixel value C1rgb is less than the threshold value M1, that is, when a printing density of the pixel value C1rgb is less than a predetermined density, the correction unit 142 ends the processing without performing the correction since the decrease of the printing density owing to the trapping phenomenon is small.

As a result of the comparison in Step S55, when the pixel value C1rgb is equal to or more than the threshold value M1, in Step S56, the correction unit 142 calculates a correction factor H2 (shown in FIG. 5B) for correcting the pixel value C2rgb of the previously-printed ink C2 by Equation 3 from the multivalued pixel value C1rgb of the later-printed ink C1 and the threshold value M1.

Note that H2min is a predetermined minimum correction factor ($0 \leq H2min \leq 1$) in the case of correcting the pixel value C2rgb, and prestored in the variable area 132. Moreover, the correction factor H2 ranges as: $H2min \leq H2 \leq 1$.

$$H2 = 1 - \{(1 - H2min) \times (C1rgb - M1)\}/(1 - M1) \qquad (3)$$

Next, in Step S57, the correction unit 142 corrects the pixel value C2rgb of the previously-printed color ink C2 by Equation 4 by using the calculated correction factor H2, and thus obtains the corrected pixel value C2'rgb.

$$C2'rgb = C2rgb \times H2 \qquad (4)$$

Specifically, when the pixel value C1rgb of the CMY color space of the later-printed color ink C1 is equal to or more than the threshold value M1, the correction unit 142 calculates the correction factor H2 from the pixel value C1rgb of the later-printed color ink C1 and the threshold value M1. Then, by using the calculated correction factor H2, the correction unit 142 corrects downward the pixel value C2rgb of the CMY color space of the previously-printed color ink C2 (so as to reduce the printing density), thus making it possible to prevent the decrease of the printing density of the later-printed color ink C1 owing to the trapping phenomenon.

EMBODIMENT 2

Figure 6:
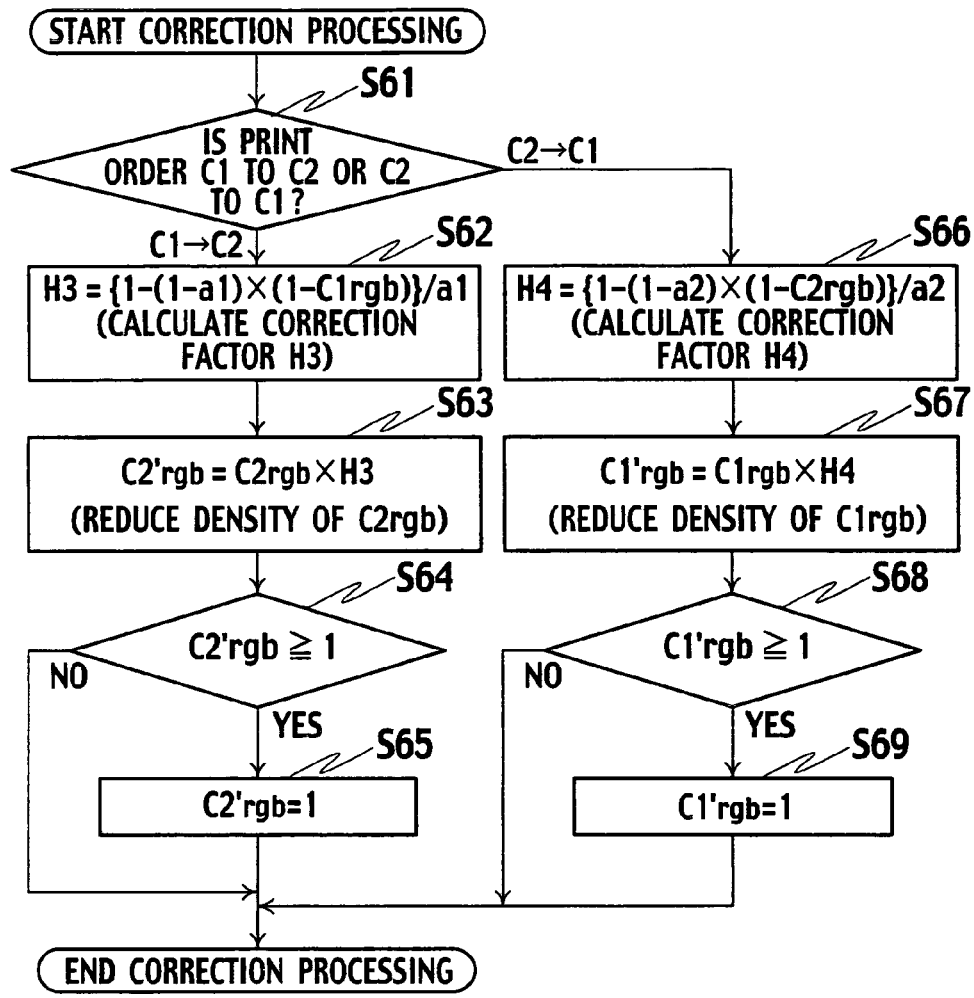
FIG. 6 is a flowchart illustrating a detailed processing procedure (Embodiment 2) of the correction processing shown in Step S45 of FIG. 3.
Figure 7A:
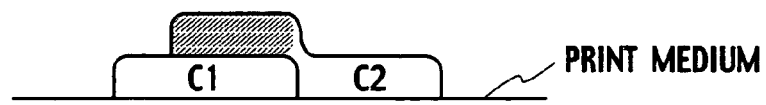
FIGS. 7A and 7B are views for explaining a trapping phenomenon.
Figure 7B:
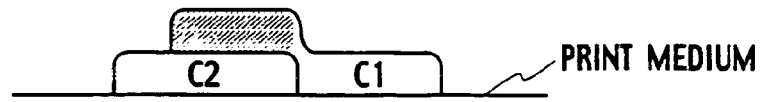

FIG. 6 is a flowchart illustrating a detailed processing procedure (Embodiment 2) of the correction processing shown in Step S45 of FIG. 3.

In Step S61, the correction unit 142 refers to the information regarding the order of the overprinting, which is acquired in Step S41. When the previously-printed color ink is the ink C1, the correction unit 142 advances the processing to Step S62, and when the previously-printed color ink is the ink C2, the correction unit 142 advances the processing to Step S66.

In Step S62, the correction unit 142 calculates a correction factor H3 for correcting the pixel value C2rgb of the later-printed color ink C2 of the CMY color space from the multivalued pixel value C1rgb of the CMY color space of the previously-printed color ink C1 and a trapping rate a1 of the later-printed color ink C2. Note that the trapping rate a1 is a rate ($0 \leq a1 \leq 1$) of the printed ink C2 when the ink C2 is solidly overprinted on the solidly printed ink C1, and is prestored in the variable area 133. Note that, when the trapping phenomenon does not occur, the trapping rate a1 is equal to 1, and the color conversion LUT 131 is created on the assumption that the trapping phenomenon does not occur (a1=1).

Here, the pixel value (printing density) of the previously-printed color ink C1 is C1rgb in the arbitrary pixel i (C1rgb, C2rgb) of the CMY color space. Accordingly, the correction factor H3 for correcting the pixel value C2rgb is obtained by adding a rate (1−C1rgb) where the previously-printed color ink C1 is not printed to a value obtained by multiplying the printing density C1rgb of the ink C1 by an inverse number of the rate a1 where the ink C2 is printed (a portion on which the previously-printed color ink C1 is not printed is not corrected). The correction factor H3 can be calculated by Equation 5 (where $0 \leq C1rgb \leq 1$, $0 \leq C2rgb \leq 1$).

$$\begin{aligned} H3 &= \{C1rgb \times (1/a1)\} + (1 - C1rgb) \\ &= \{C1rgb + a1 - a1 \times C1rgb\}/a1 \\ &= \{1 - (1 - a1 - C1rgb + a1 \times C1rgb)\}/a1 \\ &= \{1 - (1 - a1) \times (1 - C1rgb)\}/a1 \end{aligned} \qquad (5)$$

Next, in Step S63, the correction unit 142 calculates the pixel value C2'rgb obtained by correcting the pixel value C2rgb of the later-printed color ink C2 by Equation 6 by using the calculated correction factor H3.

$$C2'rgb = C2rgb \times H3 \qquad (6)$$

Note that, as a result of the calculation by Equation 6, when the pixel value C2'rgb after the correction is equal to or more than 1 (Step S64), the correction unit 142 clips the pixel value C2'rgb after the correction to "1" (Step S65).

As described above, the correction unit 142 calculates the correction factor H3 from the pixel value C1rgb of the CMY color space of the previously-printed color ink C1 and the trapping rate a1 of the later-printed color ink C2. Then, by using the calculated correction factor H3, the correction unit 142 corrects upward the pixel value C2rgb of the CMY color space of the later-printed color ink C2, that is, the printing density, thus making it possible to prevent the decrease of the printing density of the later-printed color ink C2 owing to the trapping phenomenon.

On the other hand, as a result of the determination in Step S61, when the previously-printed color ink is the ink C2, that is, when the order of the overprinting is as: ink C2 to ink C1, the correction unit 142 advances the processing to Step S66 to execute similar correction processing.

In Step S66, the correction unit 142 calculates a correction factor H4 for correcting the pixel value C1rgb of the CMY color space from the multivalued pixel value C2rgb of the CMY color space of the previously-printed color ink C2 and a trapping rate a2 of the later-printed color ink C1. Note that the trapping rate a2 is a rate ($0 \leq a2 \leq 1$) of the printed ink C1 when the ink C1 is solidly overprinted on the solidly printed ink C2, and prestored in the variable area 133.

$$\begin{aligned} H3 &= \{C2rgb \times (1/a2)\} + (1 - C2rgb) \\ &= \{C2rgb + a2 - a2 \times C2rgb\}/a2 \\ &= \{1 - (1 - a2 - C2rgb + a2 \times C2rgb)\}/a2 \\ &= \{1 - (1 - a2) \times (1 - C2rgb)\}/a2 \end{aligned} \qquad (7)$$

Next, in Step S67, the correction unit 142 calculates the pixel value C1'rgb obtained by correcting the pixel value C1rgb of the later-printed color ink C1 by Equation 8 by using the calculated correction factor H4.

$$C1'rgb = C1rgb \times H4 \quad (8)$$

Note that, as a result of the calculation by Equation 8, when the pixel value C1'rgb after the correction is equal to or more than 1 (Step S68), the correction unit 142 clips the pixel value C1'rgb after the correction to "1" (Step S69).

Specifically, when the order of the overprinting is as: ink C2 to ink C1, the pixel value C1rgb (printing density) of the later-printed color ink C1 (shaded portion in FIG. 7B) is decreased owing to the trapping phenomenon. Accordingly, the correction unit 142 calculates the correction factor H4 from the pixel value C2rgb of the CMY color space of the previously-printed color ink C2 and the trapping rate a2 of the later-printed color ink C1. Then, by using the calculated correction factor H4, the correction unit 142 corrects the pixel value C1rgb of the CMY color space of the later-printed color ink C1, that is, the correction unit 142 corrects upward the printing density (so as to increases the printing density), thus making it possible to obtain a suitable result of the printing with the trapping phenomenon taken into consideration.

EMBODIMENT 3

Figure 8:
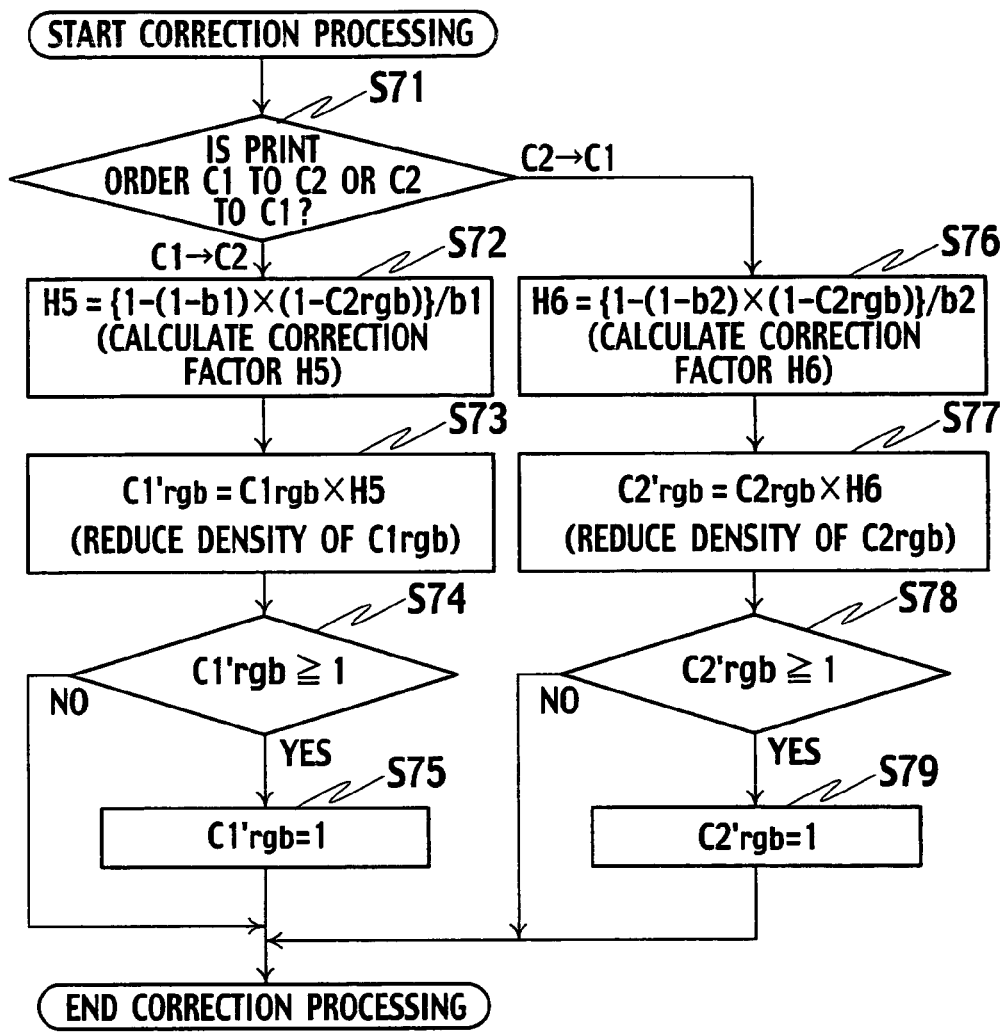
FIG. 8 is a flowchart illustrating a detailed processing procedure (Embodiment 3) of the correction processing shown in Step S45 of FIG. 3.
Figure 9A:
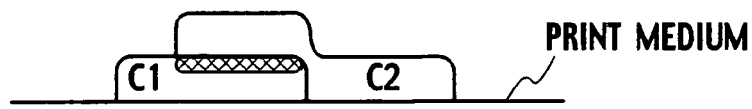
FIGS. 9A and 9B are views for explaining a back-trapping phenomenon.
Figure 9B:
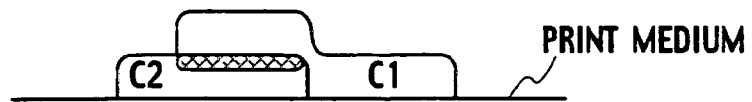

FIG. 8 is a flowchart illustrating a detailed processing procedure (Embodiment 3) of the correction processing shown in Step S45 of FIG. 3.

In Step S71, the correction unit 142 refers to the information regarding the order of the overprinting, which is acquired in Step S41. When the previously-printed color ink is the ink C1, the correction unit 142 advances the processing to Step S72, and when the previously-printed color ink is the ink C2, the correction unit 142 advances the processing to Step S76.

In Step S72, the correction unit 142 calculates a correction factor H5 for correcting the pixel value C1rgb of the CMY color space of the previously-printed color ink C1 from the multivalued pixel value C2rgb of the CMY color space of the later-printed color ink C2 and a back-trapping rate b1 by Equation 9. Note that the back-trapping rate b1 is a rate ($0 \leq b1 \leq 1$) of the printed ink C1 when the ink C2 is solidly overprinted on the solidly printed ink C1, and prestored in the variable area 133. Note that, when the back-trapping phenomenon does not occur, the back-trapping rate b1 is equal to 1, and the color conversion LUT 131 is created on the assumption that the back-trapping phenomenon does not occur (b1=1).

$$H5 = \{1-(1-b1) \times (1-C2rgb)\}/b1 \quad (9)$$

Next, in Step S73, the correction unit 142 calculates the pixel value C1' rgb obtained by correcting the pixel value C1rgb of the previously-printed color ink C1 by Equation 10 by using the calculated correction factor H5.

$$C1'rgb = C1rgb \times H5 \quad (10)$$

Note that, as a result of the calculation by Equation 10, when the pixel value C1'rgb after the correction is equal to or more than 1 (Step S74), the correction unit 142 clips the pixel value C1'rgb after the correction to "1" (Step S75).

As described above, the correction unit 142 calculates the correction factor H5 from the pixel value C2rgb of the CMY color space of the later-printed color ink C2 and the back-trapping rate b1 of the previously-printed color ink C1. Then, by using the calculated correction factor H5, the correction unit 142 corrects the pixel value C1rgb of the CMY color space of the previously-printed color ink C1, thus making it possible to prevent the decrease of the printing density of the previously-printed color ink C1 owing to the back-trapping phenomenon.

On the other hand, as a result of the determination in Step S71, when the previously-printed color ink is the ink C2, that is, when the order of the overprinting is as: ink C2 to ink C1, the correction unit 142 advances the processing to Step S76 to execute similar correction processing.

In Step S76, the correction unit 142 calculates a correction factor H6 for correcting the pixel value C2rgb of the CMY color space from the multivalued pixel value C1rgb of the CMY color space of the later-printed color ink C1 and a back-trapping rate b2 of the previously-printed color ink C2 by Equation 11. Note that the back-trapping rate b2 is a rate ($0 \leq b2 \leq 1$) of the printed ink C2 when the ink C1 is solidly overprinted on the solidly printed ink C2, and prestored in the variable area 133.

$$H6 = \{1-(1-b2) \times (1-C1rgb)\}/b2 \quad (11)$$

Next, in Step S77, the correction unit 142 calculates the pixel value C2'rgb obtained by correcting the pixel value C2rgb of the previously-printed color ink C2 by Equation 12 by using the calculated correction factor H6.

$$C2'rgb = C2rgb \times H6 \quad (12)$$

Note that, as a result of the calculation by Equation 12, when the pixel value C2'rgb after the correction is equal to or more than 1 (Step S78), the correction unit 142 clips the pixel value C2'rgb after the correction to "1" (Step S79).

Specifically, when the order of the overprinting is as: ink C2 to ink c1, the pixel value C2rgb (printing density) of the previously-printed color ink C2 (shaded portion in FIG. 9B) is decreased owing to the back-trapping phenomenon. Hence, the correction unit 142 calculates the correction factor H6 from the pixel value C1rgb of the CMY color space of the later-printed color ink C1 and the back-trapping rate b2 of the previously-printed color ink C2. Then, by using the calculated correction factor H6, the correction unit 142 corrects upward the pixel value C2rgb of the CMY color space of the previously-printed color ink C2 (so as to increases the printing density), thus making it possible to obtain a suitable result of the printing with the back-trapping phenomenon taken into consideration.

EMBODIMENT 4

Figure 10:
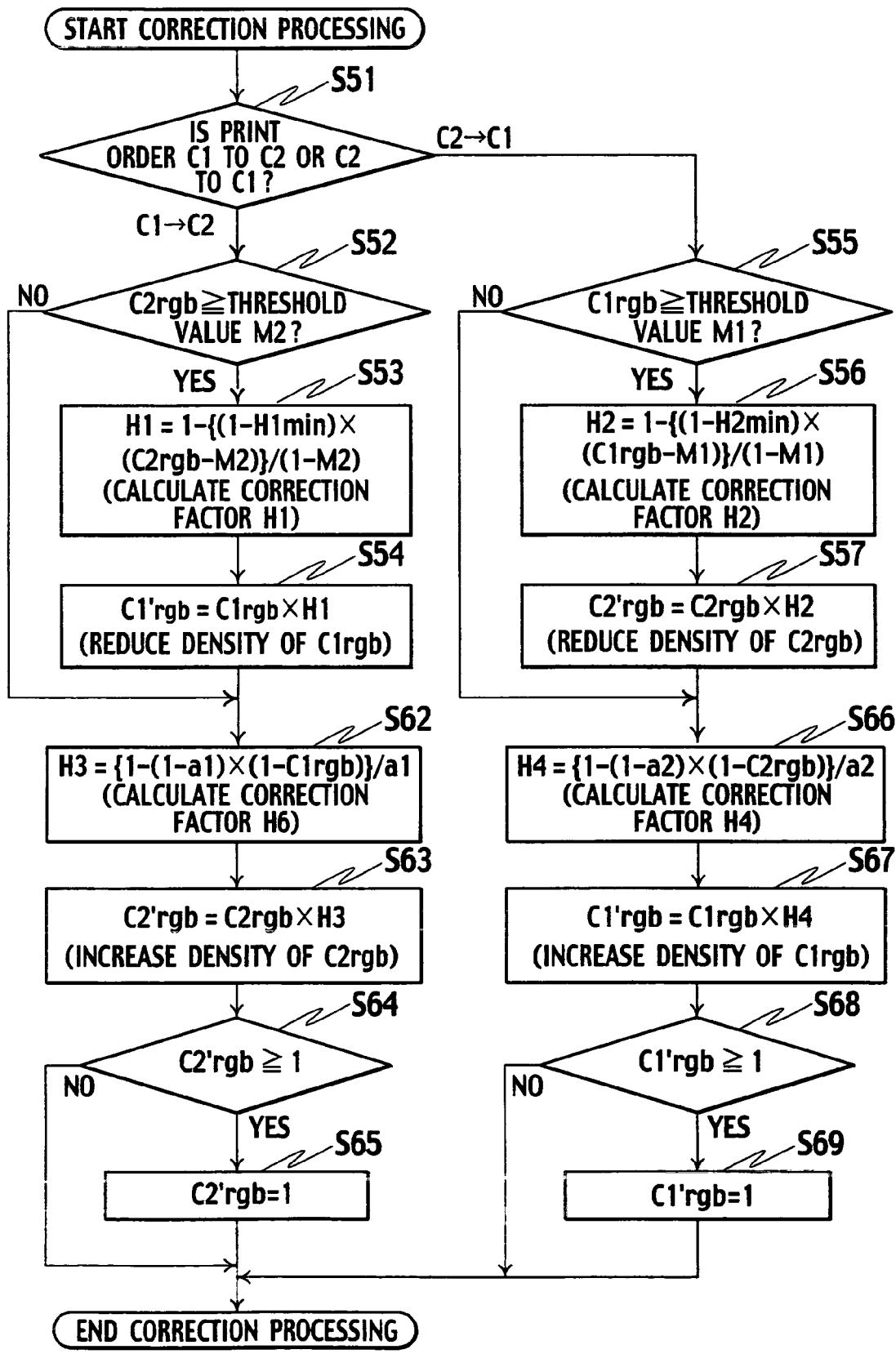
FIG. 10 is a flowchart illustrating a detailed processing procedure (Embodiment 4) of the correction processing shown in Step S45 of FIG. 3.

FIG. 10 is a flowchart illustrating a detailed processing procedure (Embodiment 4) of the correction processing shown in Step S45 of FIG. 3. The correction processing in Embodiment 4 is correction processing for reducing influences from the trapping phenomenon more effectively by combining the correction processing (Embodiment 1) shown in FIGS. 4 and 5 and the correction processing (Embodiment 2) shown in FIGS. 6 and 7.

As shown in FIG. 10, when the previously-printed color ink is the ink C1 (Step S51), in a way similar to the processing in Steps S52 to S54 in Embodiment 1, the correction unit 142 calculates the correction factor H1 from the pixel value C2rgb of the CMY color space corresponding to the later-printed color ink C2 and the threshold value M2. Then, by using the calculated correction factor H1, the correction unit 142 corrects downward the pixel value C1rgb of the CMY color space of the previously-printed color ink C1 so as to be lower, thereby preventing the decrease of the printing density of the later-printed color ink C2 owing to the trapping phenomenon.

Moreover, in a way similar to the processing in Steps S62 to S65 in Embodiment 2, the correction unit 142 calculates the correction factor H3 from the pixel value C1rgb of the CMY color space of the previously-printed color ink C1 and the trapping rate a1 of the later-printed color ink C2. Then, by using the calculated correction factor H3, the correction unit 142 corrects upward the pixel value C2rgb of the CMY color space of the later-printed color ink C2, thereby preventing the decrease of the printing density of the later-printed color ink C2 owing to the trapping phenomenon.

As described above, in order to remove the influences from the trapping phenomenon, the correction unit 142 corrects downward the printing density of the previously-printed color ink C1, and the correction unit 142 corrects upward the printing density of the later-printed color ink C2, thus making it possible to prevent the decrease of the printing density of the later-printed color ink C2 owing to the trapping phenomenon more effectively.

In a way similar to the above, when the previously-printed color ink is the ink C2 (Step S51), in a way similar to the processing in Steps S55 to S57 in Embodiment 1, the correction unit 142 calculates the correction factor H2 from the pixel value C1rgb of the CMY color space of the later-printed color ink C1 and the threshold value M1. Then, by using the calculated correction factor H2, the correction unit 142 corrects the pixel value C2rgb of the CMY color space of the previously-printed color ink C2, thereby preventing the decrease of the printing density of the later-printed color ink C1 owing to the trapping phenomenon.

Moreover, in a way similar to the processing in Steps S66 to S69 In Embodiment 2, the correction unit 142 calculates the correction factor H4 from the pixel value C2rgb of the CMY color space of the previously-printed color ink C2 and the trapping rate a2 of the later-printed color ink C1. Then, by using the calculated correction factor H4, the correction unit 142 corrects upward the pixel value C1rgb of the CMY color space of the later-printed color ink C1, thereby preventing the decrease of the printing density of the later-printed color ink C1 owing to the trapping phenomenon.

Specifically, the correction unit 142 corrects downward the printing density of the previously-printed color ink C2, and corrects upward the printing density of the later-printed color ink C1, thus making it possible to prevent the decrease of the printing density of the later-printed color ink C1 owing to the trapping phenomenon more effectively.

EMBODIMENT 5

In Embodiments 1 to 4, the examples of correcting the arbitrary pixel i(C1rgb, C2rgb) of the CMY multivalued image data converted with reference to the color conversion LUT 131 in response to the color inks used for printing and the order of the overprinting thereof have been described.

As opposed to the above, in Embodiment 5, a description will be made of an example of removing the influences from the trapping phenomenon, the back-trapping phenomenon, and the like by correcting the respective pixel values of the CMY color space, which are included in the relationships between the pixel values of the RGB color space and the pixel values of the CMY color space, the relationships being stored in the color conversion LUT 131, by the correction processing described in Examples 1 to 4.

Figure 11:
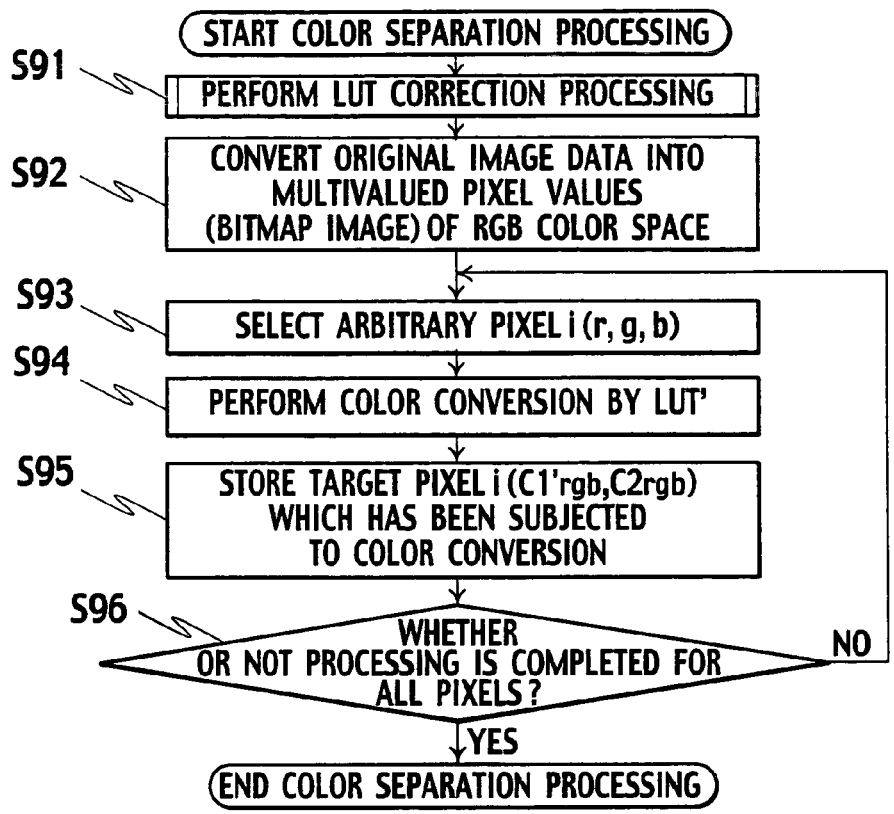
FIG. 11 is a flowchart showing a processing procedure example of color separation processing in Embodiment 5.

FIG. 11 is a flowchart illustrating a processing procedure in the case of performing the color separation processing shown in Step S06 of FIG. 2 by using a color conversion LUT' 131 subjected to the correction processing in this embodiment.

In Step S91, the image processing device 140 performs the correction processing for the color conversion LUT 131 in response to the color inks used for printing and the order of the overprinting thereof. Details of the correction processing for the color conversion LUT 131 will be described later.

In Step S92, the image processing device 140 expands the multicolor original image data read in the original reading unit 101 into the multivalued pixel values (bitmap image) of the RGB color space.

In Step S93, the color space coordinate conversion unit 141 selects, as a parameter, the arbitrary pixel i(r, g, b) in the RGB multivalued image data based on the color conversion LUT' 131.

In Step S94, the color space coordinate conversion unit 141 converts the RGB multivalued image data into a pixel i(C1'rgb, C2rgb) of the CMY color space with reference to the color conversion LUT' 131 in response to the selected arbitrary pixel i (r, g, b). Note that, though a description will be made here of the case of converting the RGB multivalued image data into the pixel i(C1'rgb, C2rgb) of the CMY color space, the present invention is also applicable to the case of converting the RGB multivalued image data into a pixel i(C1rgb, C2'rgb) of the CMY color space.

In Step S95, the control unit 104 stores the color-converted pixel i(C1'rgb, C2rgb) of the CMY multivalued image, which is converted by the color space coordinate conversion unit 141, in the RAM of the control unit 104.

In Step S96, the image processing device 140 determines whether or not the color conversion processing is completed for the entire pixels of the RGB multivalued image data. When the color conversion processing is completed for the entire pixels, the image processing device 140 ends this color separation processing. On the contrary, when the pixels for which the correction processing is uncompleted remain, the image processing device 140 returns the processing to Step S92.

Figure 12:
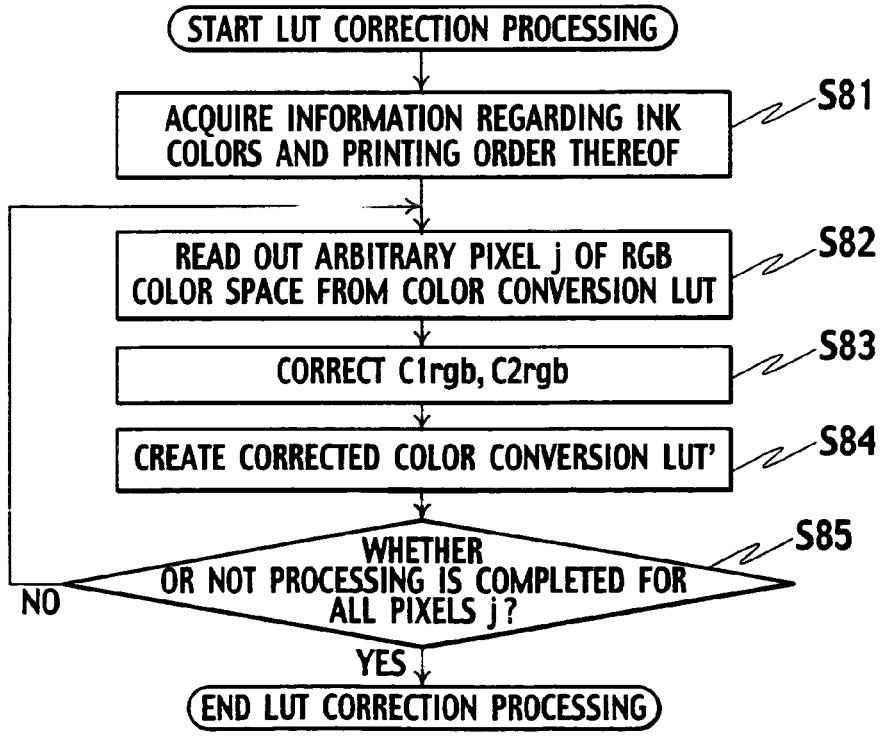
FIG. 12 is a flowchart showing correction processing for a color conversion LUT 131.

FIG. 12 shows an example of a processing procedure of the correction processing for the color conversion LUT 131.

In Step S81, the image processing device 140 acquires, from the control unit 104, the information regarding the color inks used for printing, and the information regarding the order of the overprinting (ink C1→Pink C2 or ink C2→ink C1).

The image processing device 140 reads out an arbitrary pixel value j of the RGB color space from the color conversion LUT 131 in Step S82, corrects a pixel value j of the CMY color space corresponding to the read arbitrary pixel value j of the RGB color space by the correction processing described in Embodiment 1 to Embodiment 4 in Step S83, and creates the color conversion LUT' 131 by the arbitrary pixel value j of the RGB color space and a pixel value j' of the CMY color space, which is subjected to the correction processing, in Step S84.

In Step S85, LIe image processing device 140 determines whether or not the processing is completed for the entire pixels j of the RGB color space of the color conversion LUT131. When the processing is completed for the entire pixels j, the image processing device 140 ends this correction processing. On the contrary, when the pixels j for which the correction processing is uncompleted remain, the image processing device 140 returns the processing to Step S82.

The corrected color conversion LUT' 131 is created by the above-described processing.

As described above, the image processing device 140 corrects the multivalued pixel values of the CMY color space, which are stored in the color conversion LUT 131 correspondingly to the multivalued pixel values of the RGB color space, in response to the ink C1 and the ink C2 used for printing and the order of the overprinting thereof, and with reference to the corrected color conversion LUT' 131, converts the multivalued pixel values of the RGB color space into the multivalued pixel values of the CMY color space corresponding to the ink C1 and the ink C2. In such a way, the influences from the trapping phenomenon, the back-trapping phenomenon, and the like, which occur at the time of the overprinting, can be removed, and a good result of the printing can be obtained.

EMBODIMENT 6

Embodiment 1 to Embodiment 5 have shown the examples of executing the correction processing in the image processing device 140 incorporated in the stencil making machine 100. Embodiment 6 will show an example of executing the above-described correction processing in a printer driver 240 incorporated in the original creation device 200.

Figure 13:
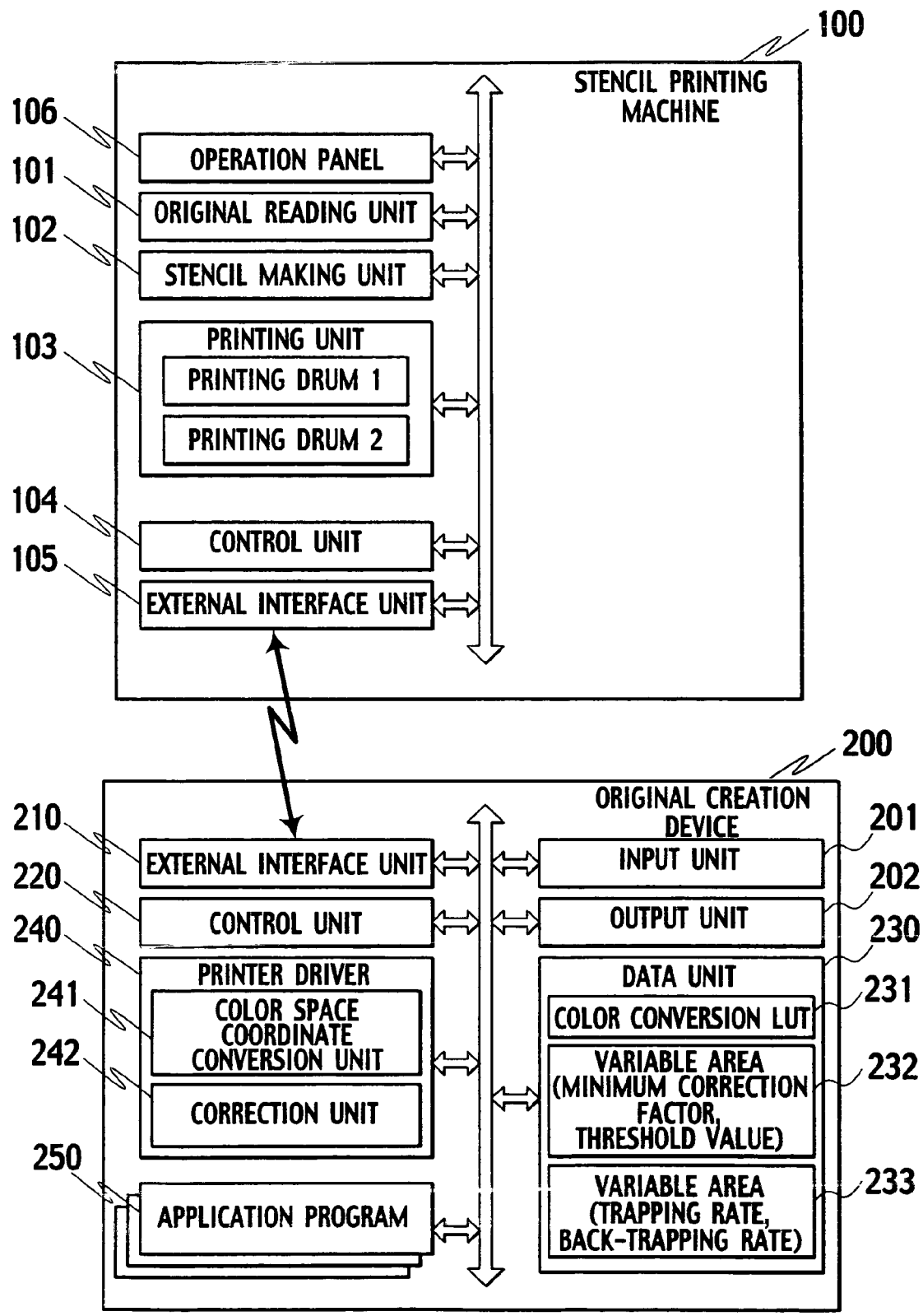
FIG. 13 is a schematic block diagram showing a configuration example of a printing system in Embodiment 6.

As shown in FIG. 13, the original creation device 200 is realized, for example, by a personal computer and the like, and includes an input unit 210 such as a keyboard and a mouse which enter information, an output unit 202 such as a display device which displays processed information and data, an external interface unit 210 for connecting the original creation unit 200 to the outside through a network and the like, a control unit 220 composed of a central processing unit (CPU), a ROM which stores programs and data, a RAM as a work area, and the like, any of which is not shown, a data unit 230, a printer driver 240, a large-capacity hard disk (not shown) which stores one or more application programs 250, and the like. Moreover, the data unit 230 includes a color conversion LUT 231, a variable area 232, and a variable area 233, and the printer driver 240 includes a color space coordinate conversion unit 241, and a correction unit 242.

Note that the color conversion LUT 231, the variable area 232, the variable area 233, the color space coordinate conversion unit 241, and the correction unit 242 are equivalent to the color conversion LUT 131, the variable area 132, the variable area 133, the color space coordinate conversion unit 141, which have been described in Embodiment 1, and details thereof will be omitted.

A brief description will be made below of a processing procedure, for example, in the case of being realized by a similar method to that of Embodiment 1.

Upon receiving, from the user, an instruction to print multicolor original image data (image data of a multicolor original) created by the application programs 250 and the like, the printer driver 240 acquires the information regarding the inks used for printing and the order of the overprinting thereof from the stencil printing machine 100 through the external interface unit 210.

Next, the color space conversion unit 241 selects an arbitrary pixel i of multivalued pixel values of an RGB color space of the multicolor original image data created by the application programs 250 and the like, executes the color conversion for the pixel values from the RGB color space to the CMY color space with reference to the color conversion LUT 231, and passes the converted pixel values (image data) of the CMY color space to the correction unit 242.

Then, the correction unit 242 performs the correction processing for the received pixel i of the CMY color space based on the information regarding the inks used for printing and the order of the overprinting thereof, which is received from the stencil printing machine 100, thereby creating stencil-making image data (for details, refer to FIG. 4).

The correction unit 242 repeats the above-described processing until the conversion processing is completed for the multivalued pixel values of the RGB color space of the multicolor original image data.

Then, after the conversion processing is ended, the original creation device 200 transmits the stencil-making image data to the stencil printing machine 100 through the external interface unit 210. Note that it is needless to say that the stencil-making image data is converted by the printer driver 240 into a format understandable by the stencil printing machine 100.

Then, the color space coordinate conversion unit 241 and correction unit 242 of the printer driver 240 execute the processing operations described in Embodiment 2 to Embodiment 5, thus making it possible to eliminate the influences from the trapping phenomenon and the back-trapping phenomenon, and to obtain a good result of the printing.

EXPERIMENTAL EXAMPLE

Occurrence rates of the trapping phenomenon and the back-trapping phenomenon differ depending also on types of the color inks used for printing, manufacturers thereof, printing machines, and the like. Hence, a description will be briefly made of an example of experimentally deciding the minimum correction factors, the threshold values, the trapping rates, the back-trapping rates, and the like in advance.

Figures 14A, 14B, 14C:
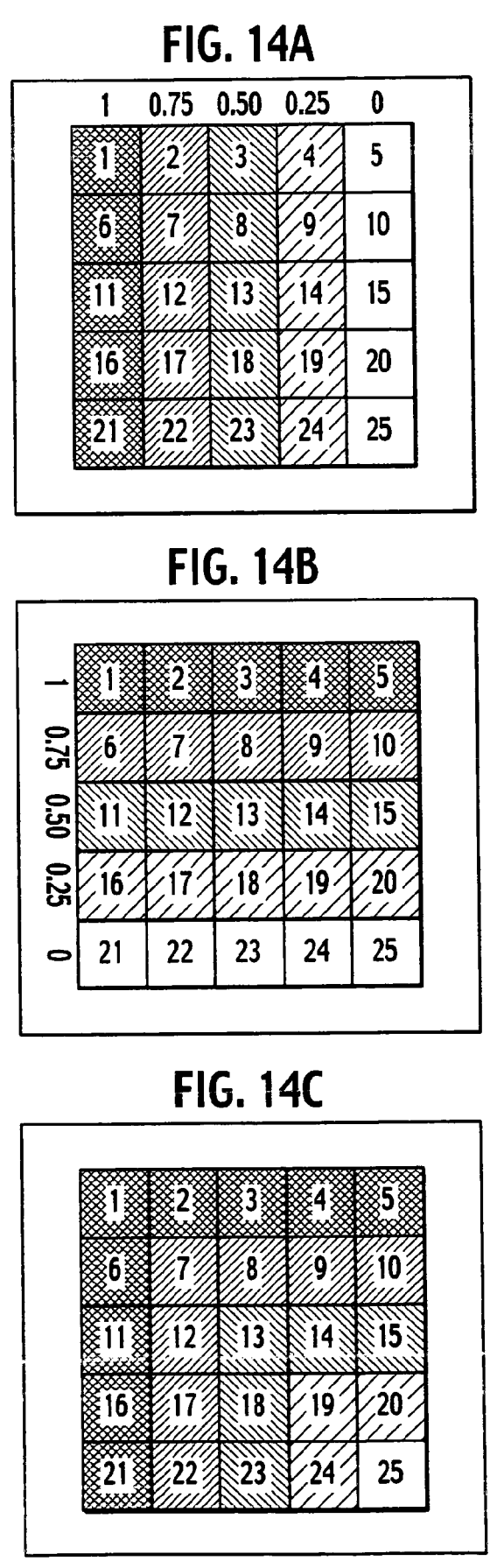

FIG. 14A shows an image example where the previously-printed color ink is printed at five stages (in decrements of 0.25) from a printing density 1 (solid) to a printing density 0 (not printed at all) in a horizontal axis direction. Partitions in a vertical axis direction are mere marks.

FIG. 14B shows an image example where the later-printed color ink is printed at five stages (in decrements of 0.25) from a printing density 1 (solid) to a printing density 0 (not printed at all) in the vertical axis direction. Partitions in the vertical axis direction are mere marks.

FIG. 14C shows an image example where the previously-printed color ink and the later-printed color ink are overprinted. In such a way, 25 types of overprinted areas from an area No. 1 where the printing density 1 of the previously-printed color ink and the printing density 1 of the later-printed color ink are overprinted to an area No. 25 where the printing density 0 of the previously-printed color ink and the printing density 0 of the later-printed color ink are overprinted can be created. The stages of the printing densities are partitioned more finely according to needs, thus making it possible to increase the number of overprinted areas.

The overprinted areas as shown in FIG. 14C are measured by a color difference meter and the like, thus making it possible to obtain the minimum correction factors, the threshold values, the trapping rates, the back-trapping rates, and the like. Note that, though it is conceived that the trapping phenomenon and the back-trapping phenomenon occur concurrently, a phenomenon which appears strongly will be selected uniquely since both of the phenomena cannot be separated from each other.

FIG. 15A is a view showing a* (previously-printed color ink) of the L*a*b* values, which is measured by the color difference meter (NR-3000 made by Nippon Denshoku Industries Co., Ltd.), the L*a*b* values being of the FIG. 14C printed by using a stencil printing machine (RISO V8000 made by Riso Kagaku Corporation), previously-printed color ink (red ink: RISO INK V TYPE S-3487), and later-printed color ink (black ink: RISO INK V TYPE S-4170).

Note that "Pattern 1" is an example of overprinting the later-printed color ink under a condition where the trapping phenomenon and the back-trapping phenomenon can be ignored, that is, after the previously-printed color ink is printed and completely dried.

"Pattern 2" is an example of overprinting the later-printed color ink after the previously-printed color ink is printed (in this case, the trapping phenomenon is regarded to be occurring since the trapping phenomenon occurs more strongly than the back-trapping phenomenon). "Pattern 3" is an example where the trapping phenomenon is regarded to occur, and the previously-printed color ink is printed at the corrected printing density based on the color conversion LUT.

Figure 16:
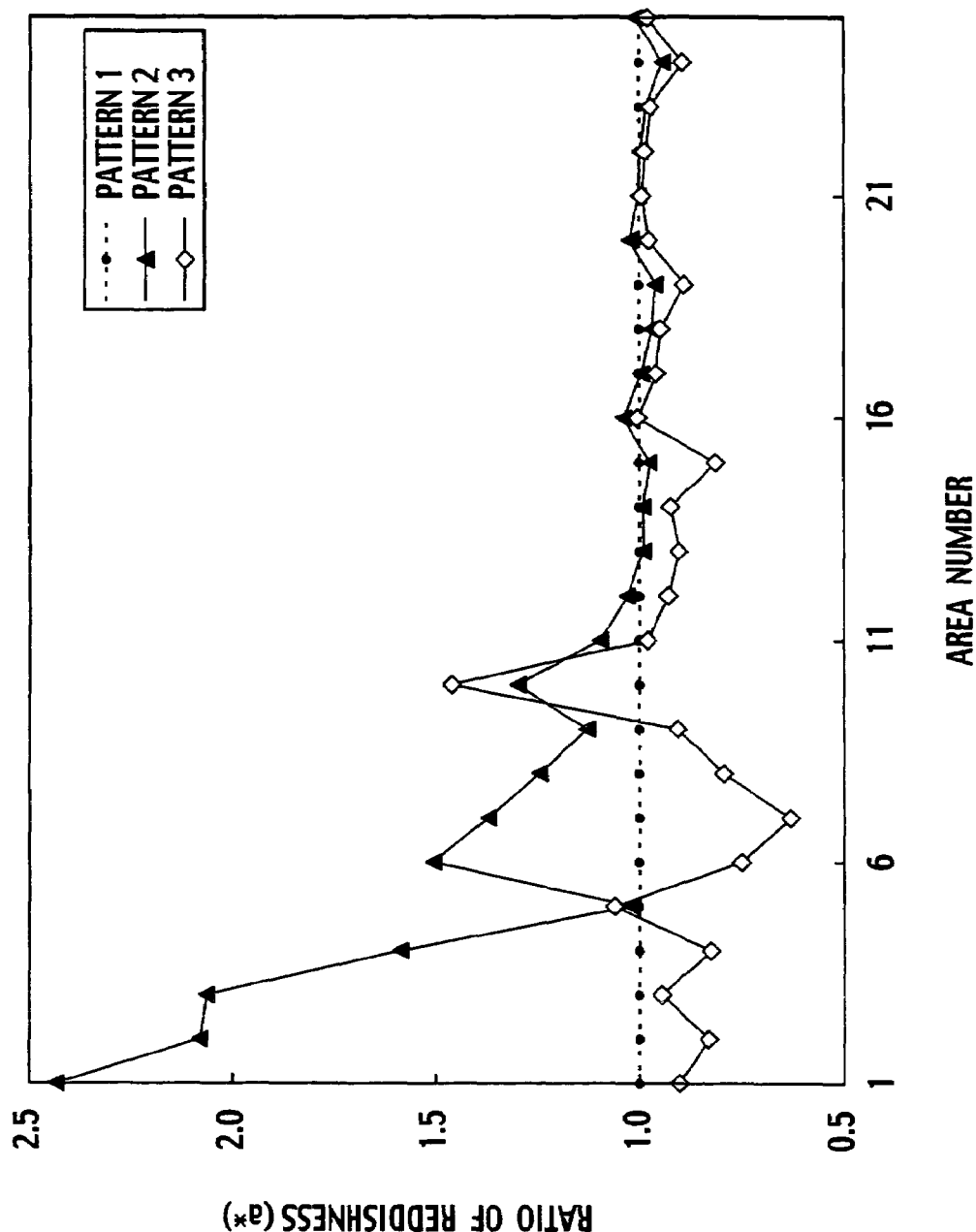
FIG. 16 is a view showing the ratios shown in FIG. 15B by a graph.

FIG. 15B is a view showing ratios of measurement values of a* of "Pattern 2" and "Pattern 3" when the measurement values of a* of "Pattern 1" are converted to "1". FIG. 16 is a view showing FIG. 15B by a graph.

It is understood that "Pattern 3" (where the correction processing for the trapping phenomenon is performed) is approximated to "Pattern 1" (ideal result of the printing, where the trapping phenomenon does not occur) as compared with "Pattern 2" (where the correction processing for the trapping phenomenon is not performed) as shown in FIGS. 15A and 15B and FIG. 16. Moreover, it is understood that there are hardly any influences from the trapping phenomenon in the areas Nos. 11, 16 and 21 where the later-printed color ink is printed at a somewhat dense printing density among the areas Nos. 1, 6, 11, and 21 where the previously-printed color ink is printed at a dense printing density.

As apparent from the above description, in accordance with the image processing device 140, the image processing method, and the printer driver 240 according to the embodiments, the multivalued pixel values of the CMY color space, which are converted with reference to the color conversion LUT 131, or the multivalued pixel values of the CMY color space, which are stored in the color conversion LUT, are corrected in response to the color inks used for printing and the order of the overprinting thereof. Accordingly, a suitable result of the overprinting can be obtained even if the color conversion LUT 131 which considers the trapping phenomenon and the back-trapping phenomenon is not prepared in advance.

Moreover, the correction factors H1 and H2 are calculated from the multivalued pixel values of the CMY color space corresponding to the later-printed color ink and the threshold values, and by using the calculated correction factors H1 and H2, the multivalued pixel values of the CMY color space corresponding to the previously-printed color ink are corrected, thus making it possible to prevent the decrease of the printing density of the later-printed color ink owing to the trapping phenomenon.

Alternatively, the correction factors H3 and H4 are calculated from the multivalued pixel values of the CMY color space corresponding to the previously-printed color ink and the trapping rates a1 and a2 of the later-printed color ink, and by using the calculated correction factors H3 and H4, the multivalued pixel values of the CMY color space corresponding to the later-printed color ink are corrected, thus making it possible to prevent the decrease of the printing density of the later-printed color ink owing to the trapping phenomenon.

Furthermore, the correction factors H5 and H6 are calculated from the multivalued pixel values of the CMY color space corresponding to the later-printed color ink and the trapping rates b1 and b2 of the previously-printed color ink, and by using the calculated correction factors H5 and H6, the multivalued pixel values of the CMY color space corresponding to the previously-printed color ink are corrected, thus making it possible to prevent the decrease of the printing density of the previously-printed color ink owing to the back-trapping phenomenon.

Hence, a suitable result of the printing can be obtained even if the color conversion LUT which considers the color inks used for printing and the order of the overprinting thereof is not prepared in advance.

The description has been made above in detail of the embodiments of the present invention; however, the present invention can be embodied in other various forms without departing from the spirit thereof or main features thereof.

For example, the present invention has been described by taking as an example the stencil printing machine 100 which attaches two printing drums thereto and is capable of two-color printing in the embodiments; however, the present invention can also be applied to a multicolor printing machine including three or more printing drums, and can also be applied to other printing machines such as, for example, an offset printing machine and an inkjet printing machine without being limited to the stencil printing machine.

Moreover, the image processing device 140 may also be incorporated, for example, in a printer server, a raster image processor, and the like as well as the stencil printing machine 100, or may be constructed as an independent device.

As described above, the above-described embodiments are mere examples in every point, and the present invention should not be interpreted restrictively. The scope of the present invention should be shown by the scope of claims, and is not restricted by the main body of the specification. Moreover, modifications and alterations, which belong to the equilibrium range of the scope of the claims, are entirely incorporated within the scope of the present invention.

INDUSTRIAL APPLICABILITY

According to the present invention, an image processing device, an image processing method, and a printer driver can be provided, which are capable of obtaining a desired result of the overprinting, even if the color conversion LUT with the trapping phenomenon and the back-trapping phenomenon taken into consideration is not prepared in advance.

The invention claimed is:

1. An image processing device for, when overprinting a multicolor original with a plurality of color inks, converting multivalued pixel values of a color space corresponding to an image of the multicolor original into multivalued pixel values of a color space corresponding to the color inks, the image processing device comprising:

a color space coordinate conversion unit configured to, with reference to a color conversion LUT which stores relationship between the multivalued pixel values of the color space corresponding to the multicolor original and the multivalued pixel values of the color space corresponding to the color inks, convert the multivalued pixel values of the color space corresponding to the multicolor original into the multivalued pixel values of the color space corresponding to the color inks; and a correction unit configured to correct at least one of the multivalued pixel values of the color space corresponding to the color inks, the multivalued pixel values being converted based on the color conversion LUT, and the multivalued pixel values of the color space corresponding to the color inks, the multivalued pixel values being stored in the color conversion LUT, according to the color inks and an overprint sequence of the color inks, wherein, when the multivalued pixel values of the color space corresponding to a later-printed color ink are equal to or more than a predetermined threshold value, the correction unit calculates a correction factor from the threshold value and the multivalued pixel values of the color space corresponding to the later-printed color ink according to the overprint sequence, and by using the calculated correction factor, corrects the multivalued pixel values of the color space corresponding to a previously-printed color ink.

2. The image processing device according to claim 1, wherein the color conversion LUT stores the relationship between the multivalued pixel values of the color space corresponding to the multicolor original and the multivalued pixel values of the color space corresponding to the color inks, the relationship being for the case where both or one of a trapping phenomenon and a back-trapping phenomenon does not occur when the color inks are overprinted.

3. An image processing device for, when overprinting a multicolor original with a plurality of color inks, converting multivalued pixel values of a color space corresponding to an image of the multicolor original into multivalued pixel values of a color space corresponding to the color inks, the image processing device comprising:
a color space coordinate conversion unit configured to, with reference to a color conversion LUT which stores relationship between the multivalued pixel values of the color space corresponding to the multicolor original and the multivalued pixel values of the color space corresponding to the color inks, convert the multivalued pixel values of the color space corresponding to the multicolor original into the multivalued pixel values of the color space corresponding to the color inks; and
a correction unit configured to correct at least one of the multivalued pixel values of the color space corresponding to the color inks, the multivalued pixel values being converted based on the color conversion LUT, and the multivalued pixel values of the color space corresponding to the color inks, the multivalued pixel values being stored in the color conversion LUT, according to the color inks and an overprint sequence of the color inks,
wherein the correction unit calculates a correction factor from the multivalued pixel values of the color space corresponding to a previously-printed color ink and a trapping rate of a later-printed color ink according to the overprint sequence, and by using the calculated correction factor, corrects the multivalued pixel values of the color space corresponding to the later-printed color ink.

4. The image processing device according to claim 3, wherein the color conversion LUT stores the relationship between the multivalued pixel values of the color space corresponding to the multicolor original and the multivalued pixel values of the color space corresponding to the color inks, the relationship being for the case where both or one of a trapping phenomenon and a back-trapping phenomenon does not occur when the color inks are overprinted.

5. An image processing device for, when overprinting a multicolor original with a plurality of color inks, converting multivalued pixel values of a color space corresponding to an image of the multicolor original into multivalued pixel values of a color space corresponding to the color inks, the image processing device comprising:
a color space coordinate conversion unit configured to, with reference to a color conversion LUT which stores relationship between the multivalued pixel values of the color space corresponding to the multicolor original and the multivalued pixel values of the color space corresponding to the color inks, convert the multivalued pixel values of the color space corresponding to the multicolor original into the multivalued pixel values of the color space corresponding to the color inks; and
a correction unit configured to correct at least one of the multivalued pixel values of the color space corresponding to the color inks, the multivalued pixel values being converted based on the color conversion LUT, and the multivalued pixel values of the color space corresponding to the color inks, the multivalued pixel values being stored in the color conversion LUT, according to the color inks and an overprint sequence of the color inks,
wherein the correction unit calculates a correction factor from the multivalued pixel values of the color space corresponding to a later-printed color ink and a back-trapping rate of a previously-printed color ink according to the overprint sequence, and by using the calculated correction factor, corrects the multivalued pixel values of the color space corresponding to the previously-printed color ink.

6. The image processing device according to claim 5, wherein the color conversion LUT stores the relationship between the multivalued pixel values of the color space corresponding to the multicolor original and the multivalued pixel values of the color space corresponding to the color inks, the relationship being for the case where both or one of a trapping phenomenon and a back-trapping phenomenon does not occur when the color inks are overprinted.

7. A printer driver of a printing machine which overprints a multicolor original with a plurality of color inks based on image data of the multicolor original, the image data being created by an application program, the printer driver comprising:
a color space coordinate conversion unit configured to, with reference to a color conversion LUT which stores relationship between multivalued pixel values of a color space corresponding to the multicolor original and multivalued pixel values of a color space corresponding to the color inks, convert the multivalued pixel values of the color space corresponding to the multicolor original into multivalued pixel values of the color space corresponding to the color inks; and a correction unit configured to correct at least one of the multivalued pixel values of the color space corresponding to the color inks, the multivalued pixel values being stored in the color conversion LUT, and the multivalued pixel values of the color space corresponding to the color inks, the multivalued pixel values being converted with reference to the color conversion LUT, according to the color inks and an overprint sequence of the color inks,
wherein, when the multivalued pixel values of the color space corresponding to a later-printed color ink are equal to or more than a predetermined threshold value, the correction unit calculates a correction factor from the threshold value and the multivalued pixel values of the color space corresponding to the later-printed color ink according to the overprint sequence, and by using the calculated correction factor, corrects the multivalued pixel values of the color space corresponding to a previously-printed color ink.

8. The printer driver according to claim 7, wherein the color conversion LUT stores the relationship between the multivalued pixel values of the color space corresponding to the multicolor original and the multivalued pixel values of the color space corresponding to the color inks, the relationship being for the case where both or one of a trapping phenomenon and a back-trapping phenomenon does not occur when the color inks are overprinted.

9. A printer driver of a printing machine which overprints a multicolor original with a plurality of color inks based on image data of the multicolor original, the image data being created by an application program, the printer driver comprising:
- a color space coordinate conversion unit configured to, with reference to a color conversion LUT which stores relationship between multivalued pixel values of a color space corresponding to the multicolor original and multivalued pixel values of a color space corresponding to the color inks, convert the multivalued pixel values of the color space corresponding to the multicolor original into multivalued pixel values of the color space corresponding to the color inks; and a correction unit configured to correct at least one of the multivalued pixel values of the color space corresponding to the color inks, the multivalued pixel values being stored in the color conversion LUT, and the multivalued pixel values of the color space corresponding to the color inks, the multivalued pixel values being converted with reference to the color conversion LUT, according to the color inks and an overprint sequence of the color inks,
- wherein the correction unit calculates a correction factor from the multivalued pixel values of the color space corresponding to a previously-printed color ink and a trapping rate of later-printed color ink according to the overprint sequence, and by using the calculated correction factor, corrects the multivalued pixel values of the color space corresponding to the later-printed color ink.

10. The printer driver according to claim 9, wherein the color conversion LUT stores the relationship between the multivalued pixel values of the color space corresponding to the multicolor original and the multivalued pixel values of the color space corresponding to the color inks, the relationship being for the case where both or one of a trapping phenomenon and a back-trapping phenomenon does not occur when the color inks are overprinted.

11. A printer driver of a printing machine which overprints a multicolor original with a plurality of color inks based on image data of the multicolor original, the image data being created by an application program, the printer driver comprising:
- a color space coordinate conversion unit configured to, with reference to a color conversion LUT which stores relationship between multivalued pixel values of a color space corresponding to the multicolor original and multivalued pixel values of a color space corresponding to the color inks, convert the multivalued pixel values of the color space corresponding to the multicolor original into multivalued pixel values of the color space corresponding to the color inks; and a correction unit configured to correct at least one of the multivalued pixel values of the color space corresponding to the color inks, the multivalued pixel values being stored in the color conversion LUT, and the multivalued pixel values of the color space corresponding to the color inks, the multivalued pixel values being converted with reference to the color conversion LUT, according to the color inks and an overprint sequence of the color inks,
- wherein the correction unit calculates a correction factor from the multivalued pixel values of the color space corresponding to later-printed color ink and a back-trapping rate of previously-printed color ink according to the overprint sequence, and by using the calculated correction factor, corrects the multivalued pixel values of the color space corresponding to the previously-printed color ink.

12. The printer driver according to claim 11, wherein the color conversion LUT stores the relationship between the multivalued pixel values of the color space corresponding to the multicolor original and the multivalued pixel values of the color space corresponding to the color inks, the relationship being for the case where both or one of a trapping phenomenon and a back-trapping phenomenon does not occur when the color inks are overprinted.

* * * * *